United States Patent
Cho et al.

(10) Patent No.: US 9,625,270 B2
(45) Date of Patent: *Apr. 18, 2017

(54) ELECTRONIC APPARATUS, CONTROL METHOD THEREOF, COMPUTER PROGRAM, AND COMPUTER-READABLE RECORDING MEDIUM

(71) Applicant: THINKWARE CORPORATION, Seongnam-si, Gyeonggi-do (KR)

(72) Inventors: Ho Hyung Cho, Seongnam-si (KR); Suk Pil Ko, Seongnam-si (KR)

(73) Assignee: THINKWARE CORPORATION, Seongnam-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/954,333

(22) Filed: Nov. 30, 2015

(65) Prior Publication Data

US 2016/0153801 A1 Jun. 2, 2016

(30) Foreign Application Priority Data

Dec. 1, 2014 (KR) .......... 10-2014-0170050
Mar. 16, 2015 (KR) .......... 10-2015-0036151

(51) Int. Cl.
*B60L 15/20* (2006.01)
*G01C 21/36* (2006.01)
*G06T 19/00* (2011.01)

(52) U.S. Cl.
CPC ....... *G01C 21/365* (2013.01); *G01C 21/3647* (2013.01); *G06T 19/006* (2013.01)

(58) Field of Classification Search
CPC .............. G01C 21/365; G01C 21/3647; G06K 9/00671; G06T 19/006
See application file for complete search history.

(56) References Cited

U.S. PATENT DOCUMENTS

2011/0052042 A1* 3/2011 Ben Tzvi .............. G06T 19/006
382/154
2014/0285523 A1* 9/2014 Gruenler ............... G06T 19/006
345/633

* cited by examiner

*Primary Examiner* — Yuen Wong
(74) *Attorney, Agent, or Firm* — Novick, Kim & Lee, PLLC; Sang Ho Lee

(57) ABSTRACT

Disclosed herein is a control method of an electronic apparatus. The control method of an electronic apparatus includes: determining a position of a vehicle that is being operated; detecting information of a guidance point positioned in front of the determined position of the vehicle by a predetermined distance using a map data; generating an object indicating the guidance point using the information of the guidance point; and outputting the generated object through augmented reality.

17 Claims, 30 Drawing Sheets

$$s \begin{bmatrix} x \\ y \\ 1 \end{bmatrix} = \begin{bmatrix} f_x & skew\_cf_x & c_x \\ 0 & f_y & c_y \\ 0 & 0 & 1 \end{bmatrix} \begin{bmatrix} r_{11} & r_{12} & r_{13} & t_1 \\ r_{21} & r_{22} & r_{23} & t_2 \\ r_{31} & r_{32} & r_{33} & t_3 \end{bmatrix} \begin{bmatrix} X \\ Y \\ Z \\ 1 \end{bmatrix}$$

ELECTRONIC APPARATUS, CONTROL METHOD THEREOF, COMPUTER PROGRAM, AND COMPUTER-READABLE RECORDING MEDIUM

CROSS-REFERENCE TO RELATED APPLICATION

This application claims the priority and benefit of Korean Patent Application No. 10-2014-0170050 filed on Dec. 1, 2014, Korean Patent Application No. 10-2015-0036151 filed on Mar. 16, 2015, with the Korean Intellectual Property Office, the disclosure of which is incorporated herein by reference.

BACKGROUND OF THE INVENTION

1. Field of the Invention

The present invention relates to an electronic apparatus, a control method thereof, a computer program, and a computer-readable recording medium, and more particularly, to an electronic apparatus capable of performing driving related guidance on a user on augmented reality, a control method thereof, a computer program, and a computer-readable recording medium.

2. Description of the Related Art

It is most important to safely drive a vehicle and prevent a traffic accident at the time of driving the vehicle. To this end, various assist apparatuses performing an attitude control of the vehicle, a function control of components of the vehicle, and the like, and safety apparatuses such as a safety belt, an air bag, and the like, have been mounted in the vehicle.

In addition, recently, apparatuses such as a black box, and the like, positioned in the vehicle and storing a driving image of the vehicle and data transmitted from various sensors therein to find out a cause of an accident of the vehicle at the time of occurrence of the accident have been provided in the vehicle. Portable terminals such as a smart phone and a tablet personal computer (PC) in which a black box application, a navigation application, or the like, may be mounted have been used as the apparatuses for a vehicle as described above.

However, currently, utilization of the driving image is low in the apparatuses for a vehicle as described above. In more detail, currently, even though the driving image of the vehicle is obtained through a vision sensor such as a camera mounted in the vehicle, an electronic apparatus of the vehicle has simply displayed or transmitted the driving image or has generated only simple surrounding notification information such as whether or not the vehicle has departed from a lane, or the like.

In addition, a head-up display (HUD) or an augmented reality interface has also been suggested as an electronic apparatus of the vehicle that has newly emerged currently. However, in the HUD and the augmented reality interface, the driving image of the vehicle has been utilized to be simply displayed or generate the simple surrounding notification information.

SUMMARY

An object of the present invention is to provide an electronic apparatus capable of generating an object indicating a guidance point and outputting the generated object through augmented reality when a vehicle that is being operated approaches a point within a predetermined distance from the guidance point, a control method thereof, a computer program, and a computer-readable recording medium.

According to an exemplary embodiment of the present invention, there is provided a control method of an electronic apparatus, including: determining a position of a vehicle that is being operated; detecting information of a guidance point positioned in front of the determined position of the vehicle by a predetermined distance using a map data; generating an object indicating the guidance point using the information of the guidance point; and outputting the generated object through augmented reality.

The outputting may include: performing calibration on a camera to calculate camera parameters; generating a virtual three-dimensional (3D) space for a photographed image of the camera on the basis of the camera parameters; and mapping the generated object to the virtual 3D space.

The outputting may further include: calculating position difference information between the position of the vehicle and a position of the guidance point; and determining a position of the generated object on the virtual 3D space using the position difference information.

The object may include a first object indicating the position of the guidance point in augmented reality corresponding to a real world.

An expression position of the first object may be fluidly changed depending on a distance difference between the vehicle and the guidance point.

When the vehicle passes through the guidance point, an object indicating the guidance point through which the vehicle passes may disappear from the augmented reality.

The object may further include a second object guiding the guidance point.

The outputting may be activated when the vehicle enters a point within a preset distance from the guidance point while being operated.

In the case in which the guidance point is implemented in as a guidance section including a guidance start point and a guidance end point, in the generating, an object guiding the guidance section may be generated using information of the guidance start point and the guidance end point, and in the outputting, the generated object may be output through the augmented reality during a period in which the vehicle is positioned in the guidance section.

According to another exemplary embodiment of the present invention, there is provided an electronic apparatus including: a display unit displaying a screen; a detecting unit detecting information of a guidance point positioned in front of a position of a vehicle that is being operated by a predetermined distance using a map data; an object generating unit generating an object indicating the guidance point using the information of the guidance point; and a control unit controlling the display unit to display the generated object through augmented reality.

The electronic apparatus may further include: a calibration unit performing calibration on a camera to calculate camera parameters; a 3D space generating unit generating a virtual 3D space for a photographed image of the camera on the basis of the camera parameters; and a mapping unit mapping the generated object to the generated virtual 3D space.

The control unit may calculate position difference information between the position of the vehicle and a position of the guidance point, and determine a position of the generated object on the virtual 3D space using the position difference information.

The object may include a first object indicating the position of the guidance point in augmented reality corresponding to a real world.

An expression position of the first object may be fluidly changed depending on a distance difference between the vehicle and the guidance point.

When the vehicle passes through the guidance point, an object indicating the guidance point through which the vehicle passes may disappear from the augmented reality.

The object may further include a second object guiding the guidance point.

Expression of the object in the augmented reality may be activated when the vehicle enters a point within a preset distance from the guidance point while being operated.

In the case in which the guidance point is implemented as a guidance section including a guidance start point and a guidance end point, the object generating unit may generate an object guiding the guidance section using information of the guidance start point and the guidance end point, and the control unit may control the display unit to display the generated object through the augmented reality during a period in which the vehicle is positioned in the guidance section.

According to still another exemplary embodiment of the present invention, there is provided a computer program stored in a recording medium coupled to an electronic apparatus to execute the following steps: determining a position of a vehicle that is being operated; detecting information of a guidance point positioned in front of the determined position of the vehicle by a predetermined distance using a map data; generating an object indicating the guidance point using the information of the guidance point; and outputting the generated object through augmented reality.

According to yet still another exemplary embodiment of the present invention, there is provided a computer-readable recording medium in which a computer program for executing a control method of an electronic apparatus is stored, wherein the control method of an electronic apparatus includes: determining a position of a vehicle that is being operated; detecting information of a guidance point positioned in front of the determined position of the vehicle by a predetermined distance using a map data; generating an object indicating the guidance point using the information of the guidance point; and outputting the generated object through augmented reality.

BRIEF DESCRIPTION OF DRAWINGS

FIGS. 6A and 6B are views illustrating a conversion relationship between a two-dimensional (2D) photographed image and a virtual three-dimensional (3D) space according to an exemplary embodiment of the present invention.

DETAILED DESCRIPTION

Figure 1:
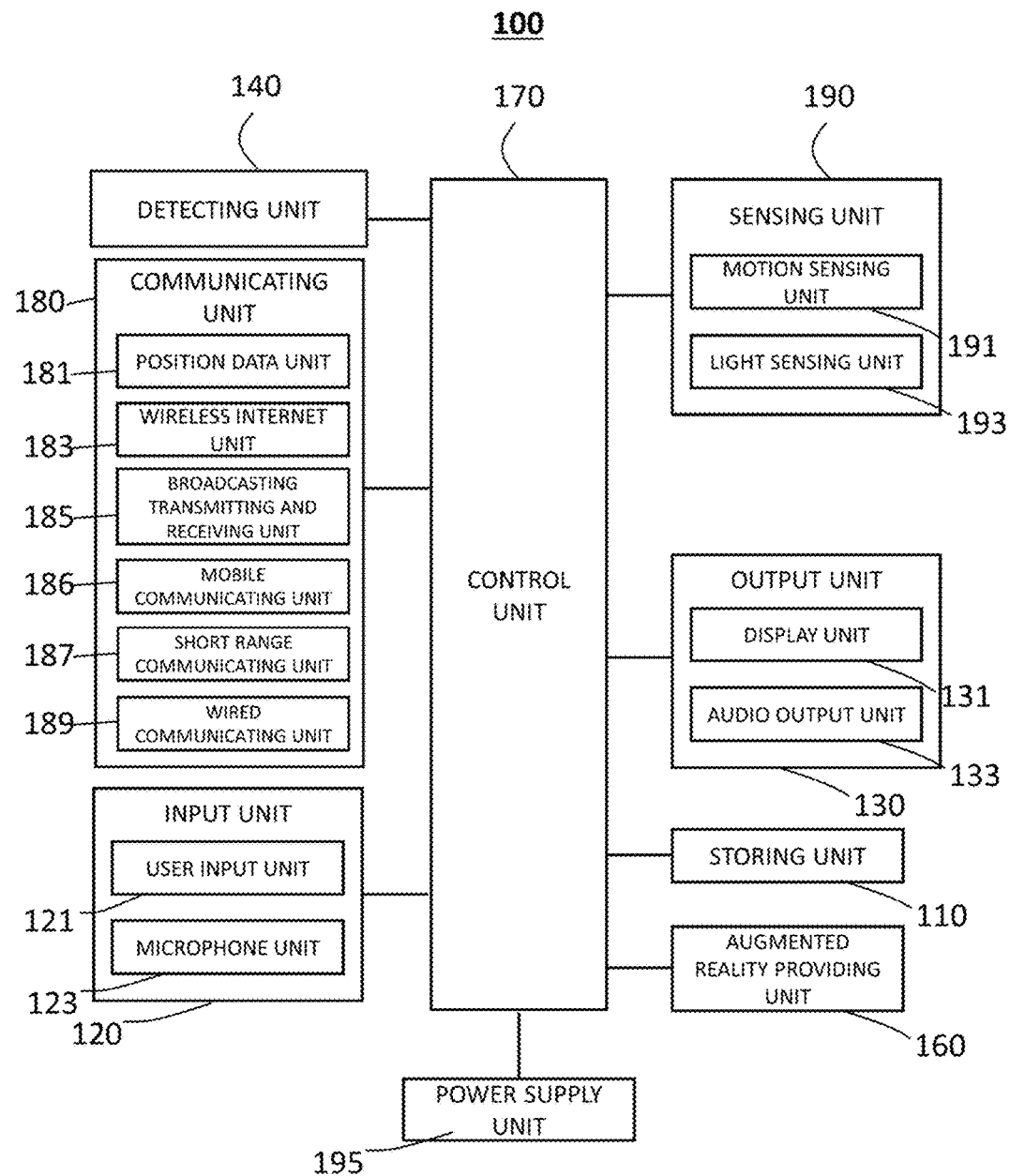
FIG. 1 is a block diagram illustrating an electronic apparatus according to an exemplary embodiment of the present invention.

The following description illustrates only a principle of the present invention. Therefore, those skilled in the art may implement the principle of the present invention and invent various apparatuses included in the spirit and scope of the present invention although not clearly described or illustrated in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices invented so as to perform the same function regardless of a structure.

Therefore, it is to be understood that, for example, block diagrams of the present specification illustrate a conceptual aspect of an illustrative circuit for embodying a principle of the present invention. Similarly, it is to be understood that all flow charts, state transition diagrams, pseudo-codes, and the like, illustrate various processes that may be tangibly embodied in a computer-readable medium and that are executed by computers or processors regardless of whether or not the computers or the processors are clearly illustrated.

Functions of various devices including processors or functional blocks represented as concepts similar to the processors and shown in the accompanying drawings may be provided by using hardware having capability to execute appropriate software as well as dedicated hardware. When the functions are provided by the processors, they may be provided by a single dedicated processor, a single shared processor, or a plurality of individual processors, and some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods of performing functions including all types of software including, for example, a combination of circuit devices performing these functions, firmware/micro codes, or the like, and are coupled to appropriate circuits for executing the software so as to execute these functions. It is to be understood that since functions provided by variously mentioned means are combined with each other and are combined with a scheme demanded by the claims in the present invention defined by the claims, any means capable of providing these functions are equivalent to means recognized from the present specification.

The above-mentioned objects, features, and advantages will become more obvious from the following detailed description associated with the accompanying drawings. Therefore, those skilled in the art to which the present invention pertains may easily practice a technical idea of the present invention. Further, in describing the present invention, in the case in which it is decided that a detailed description of a well-known technology associated with the present invention may unnecessarily make the gist of the present invention unclear, it will be omitted.

Hereinafter, various exemplary embodiments of the present invention will be described in detail with reference to the accompanying drawings.

FIG. 1 is a block diagram illustrating an electronic apparatus according to an exemplary embodiment of the present invention. Referring to FIG. 1, the electronic apparatus 100 is configured to include all or some of a storing unit 110, an input unit 120, an output unit 130, a detecting unit 140, an augmented reality providing unit 160, a control unit 170, a communicating unit 180, a sensing unit 190, and a power supply unit 195.

Here, the electronic apparatus 100 may be implemented by various apparatuses such as a smart phone, a tablet computer, a laptop computer, a personal digital assistant (PDA), a portable multimedia player (PMP), a smart glasses, a project glasses, a navigation apparatus, a black box, and the like, that may provide driving related guidance to a driver of a vehicle that is in an operated state, and may be provided in the vehicle.

Here, the operated state of the vehicle may include various states in which the vehicle is being driven by the driver, such as a stopped state of the vehicle, a driven state of the vehicle, a parked state of the vehicle, and the like.

The driving related guidance may include various kinds of guidance for assisting in driving of the driver of the vehicle, such as route guidance, lane departure guidance, front vehicle start guidance, signal lamp change guidance, front vehicle collision preventing guidance, lane change guidance, lane guidance, fuel efficiency of the vehicle, an instantaneous acceleration, traffic information, a current driving speed of the vehicle, a distance up to a specific point in front of the vehicle, a time in which the vehicle arrives at the specific point in front of the vehicle, and the like.

Here, the route guidance may include augmented reality route guidance performing route guidance by combining various information such as a position, a direction, and the like, of a user with an image obtained by photographing the front of the vehicle that is being operated and two-dimensional (2D) or three-dimensional (3D) route guidance performing route guidance by combining various information such as a position, a direction, and the like, of a user with a 2D or 3D map data. Here, the route guidance may be interpreted as a concept including route guidance in the case in which the user walks or runs and moves as well as in the case in which the user gets in the vehicle and then drives the vehicle.

In addition, the lane departure guidance may be to guide whether or not the vehicle that is being driven has departed from a lane.

In addition, the front vehicle start guidance may be to guide whether or not a vehicle positioned in front of a vehicle that is being stopped has started.

In addition, the signal lamp change guidance may be to guide whether or not a signal lamp positioned in front of a vehicle that is being stopped has been changed. As an example, the signal lamp change guidance may be to guide that a state of the signal lamp is changed from a red lamp indicating a stop signal into a green lamp indicating a start signal.

In addition, the front vehicle collision preventing guidance may be to guide that a distance between a vehicle that is being stopped or driven and a vehicle positioned in front of the vehicle is within a predetermined distance in order to prevent collision between the above-mentioned vehicles when the distance between the vehicle that is being stopped or driven and the vehicle positioned in front of the vehicle is within the predetermined distance.

In addition, the lane change guidance may be to guide a change from a lane in which a vehicle is positioned into another lane in order to guide a route up to a destination.

In addition, the lane guidance may be to guide a lane in which a vehicle is currently positioned.

A driving related image such as a front image of the vehicle enabling provision of various kinds of guidance may be photographed by a camera mounted in the vehicle. Here, the camera may be a camera formed integrally with the electronic apparatus 100 mounted in the vehicle and photographing the front of the vehicle. In this case, the camera may be formed integrally with a smart phone, a navigation apparatus, or a black box, and the electronic apparatus 100 may receive the image photographed by the camera formed integrally therewith.

As another example, the camera may be a camera mounted in the vehicle separately from the electronic apparatus 100 and photographing the front of the vehicle. In this case, the camera may be a black box separately mounted toward the front of the vehicle, and the electronic apparatus 100 may receive a photographed image through wired/wireless communication with the separately mounted black box or receive the photographed image when a storage medium storing the photographed image of the black box therein is inserted into the electronic apparatus 100.

Hereinafter, the electronic apparatus 100 according to an exemplary embodiment of the present invention will be described in more detail on the basis of the above-mentioned content.

The storing unit 110 serves to store various data and applications required for an operation of the electronic apparatus 100 therein. Particularly, the storing unit 110 may store data required for the operation of the electronic apparatus 100, for example, an operating system (OS), a route search application, a map data, and the like, therein. In addition, the storing unit 110 may store data generated by the operation of the electronic apparatus 100, for example, a searched route data, a received image, and the like, therein.

Here, the storing unit 110 may be implemented by a detachable type of storing device such as a universal serial bus (USB) memory, or the like, as well as an embedded type of storing device such as a random access memory (RAM), a flash memory, a read only memory (ROM), an erasable programmable ROM (EPROM), an electronically erasable and programmable ROM (EEPROM), a register, a hard disk, a removable disk, a memory card, a universal subscriber identity module (USIM), or the like.

The input unit 120 serves to convert a physical input from the outside of the electronic apparatus 100 into a specific electrical signal. Here, the input unit 120 may include all or some of a user input unit 121 and a microphone unit 123.

The user input unit 121 may receive a user input such as a touch, a push operation, or the like. Here, the user input unit 121 may be implemented using at least one of a form of various buttons, a touch sensor receiving a touch input, and a proximity sensor receiving an approaching motion.

The microphone unit 123 may receive a speech of the user and a sound generated in the inside and the outside of the vehicle.

The output unit 130 is a unit outputting data of the electronic apparatus 100. Here, the output unit 130 may include all or some of a display unit 131 and an audio output unit 133.

The display unit 131 is a unit outputting data that may be visually recognized in the electronic apparatus 100. The display unit 131 may be implemented by a display unit provided on a front surface of a housing of the electronic apparatus 100. In addition, the display unit 131 may be formed integrally with the electronic apparatus 100 and output visual recognition data, or may be installed separately from the electronic apparatus 100 like a head-up display (HUD) and output visual recognition data.

The audio output unit 133 is a unit outputting data that may be auditorily recognized in the electronic apparatus 100. The audio output unit 133 may be implemented by a speaker representing a data that is to be reported to the user of the electronic apparatus 100 as a sound.

The communicating unit 180 may be provided in order for the electronic apparatus 100 to communicate with other devices. The communicating unit 180 may include all or some of a position data unit 181, a wireless Internet unit 183, a broadcasting transmitting and receiving unit 185, a mobile communicating unit 186, a short range communicating unit 187, and a wired communicating unit 189.

The position data unit 181 is a device obtaining position data through a global navigation satellite system (GNSS). The GNSS means a navigation system that may calculate a position of a receiving terminal using a radio signal received from an artificial satellite. A detailed example of the GNSS may include a global positioning system (GPS), a Galileo system, a global orbiting navigational satellite system (GLONASS), a COMPASS, an Indian regional navigational satellite system (IRNSS), a quasi-zenith satellite system (QZSS), and the like, depending on an operating subject of the GNSS. The position data unit 181 of the electronic apparatus 100 according to an exemplary embodiment of the present invention may obtain position data by receiving GNSS signals served in a zone in which the electronic apparatus 100 is used.

The wireless Internet unit 183 is a device accessing the wireless Internet to obtain or transmit data. The wireless Internet that may be accessed through the wireless Internet unit 183 may be a wireless local area network (WLAN), a wireless broadband (Wibro), a world interoperability for microwave access (Wimax), a high speed downlink packet access (HSDPA), or the like.

The broadcasting transmitting and receiving unit 185 is a device transmitting and receiving broadcasting signals through various broadcasting systems. The broadcasting system that may transmit and receive the broadcasting signals through the broadcasting transmitting and receiving unit 185 may be a digital multimedia broadcasting terrestrial (DMBT), digital multimedia broadcasting satellite (DMBS), a media forward link only (MediaFLO), a digital video broadcast handheld (DVBH), an integrated services digital broadcast terrestrial (ISDBT), or the like. The broadcasting signals transmitted and received through the broadcasting transmitting and receiving unit 185 may include a traffic data, a living data, and the like.

The mobile communicating unit 186 may access a mobile communication network to perform communication depending on various mobile communication protocols such as 3rd generation (3G), 3rd generation partnership project (3GPP), long term evolution (LTE), and the like.

The short range communicating unit 187 is a device for short range communication. The short range communicating unit 187 may perform communication through Bluetooth, radio frequency identification (RFID), infrared data association (IrDA), ultra wideband (UWB), ZigBee, near field communication (NFC), wireless-fidelity (Wi-Fi), or the like, as described above.

The wired communicating unit 189 is an interface device that may connect the electronic apparatus 100 to another device in a wired scheme. The wired communicating unit 189 may be a USB module that may perform communication through a USB port.

The communicating unit 180 may communicate with another device using at least one of the position data unit 181, the wireless Internet unit 183, the broadcasting transmitting and receiving unit 185, the mobile communicating unit 186, the short range communicating unit 187, and the wired communicating unit 189.

As an example, in the case in which the electronic apparatus 100 does not include a camera function, an image photographed by a camera for a vehicle such as a black box, or the like, may be received using at least one of the short range communicating unit 187 and the wired communicating unit 189.

As another example, in the case in which the electronic apparatus communicates with a plurality of devices, the electronic apparatus may communicate with any one of the plurality of devices through the short range communicating unit 187, and communicate with another device of the plurality of devices through the wired communicating unit 189.

The sensing unit 190 is a unit that may sense a current state of the electronic apparatus 100. The sensing unit 190 may include all or some of a motion sensing unit 191 and a light sensing unit 193.

The motion sensing unit 191 may sense motion of the electronic apparatus 100 on a 3D space. The motion sensing unit 191 may include a tri-axial terrestrial magnetism sensor and a tri-axial acceleration sensor. Motion data obtained through the motion sensing unit 191 may be combined with the position data obtained through the position data unit 181 to more accurately calculate a trajectory of the vehicle to which the electronic apparatus 100 is attached.

The light sensing unit 193 is a device measuring surrounding illuminance of the electronic apparatus 100. Brightness of the display unit 131 may be changed so as to correspond to surrounding brightness using illuminance data obtained through the light sensing unit 193.

The power supply unit 195 is a device supplying power required for an operation of the electronic apparatus 100 or an operation of another device connected to the electronic apparatus 100. The power supply unit 195 may be a device receiving power from an external power supply such as a battery embedded in the electronic apparatus 100, the vehicle, or the like. Alternatively, the power supply unit 195 may be implemented by the wired communicating unit 189 or a device receiving power in a wireless scheme depending on a scheme in which it receives the power.

The detecting unit 140 may detect information of a guidance point positioned in front of the position of the vehicle that is being operated by a predetermined distance using the map data. In detail, the detecting unit 140 may apply position information of the vehicle obtained in the position data unit 181 to the map data and detect the information of the guidance point positioned in front of the position of the vehicle by the predetermined distance.

Here, the map data may be obtained from the storing unit 110 in the electronic apparatus 100, be obtained from an external map database (DB) separate from the electronic apparatus 100, or be obtained from another electronic apparatus. The map data, which is a data for indicating a current position and a map of the surrounding zone, may include a plurality of links for indicating roads in various regions, attribute information on each of the plurality of links, information of guidance points, and the like. The attribute information on the link may include information indicating whether or not the link is a bidirectional link or a unidirectional link, information on the number of lanes of the link, information on a kind (for example, an expressway, an urban expressway, a national road, a local road, a general road, or the like) of a road corresponding to the link, and the like. The information of the guidance points may include position information of the guidance points, guidance code information (for example, information for guiding a speed limit, a speed bump, and the like) of the guidance points, and the like.

Here, the guidance point may include an over-speed regulation point, a speed bump point, a railroad crossing point, a section speed regulation point, a joining road point, a branch point, and the like. In addition, in the case in which the guidance point is implemented by a guidance section including a guidance start point and a guidance end point, the guidance point may include section speed regulation start and end points, school zone start and end points, silver zone start and end points, construction section start and end points, fog warning section start and end points, accident hazard start and end points, falling rock section start and end points, sharp curve section start and end points, slippery surface section start and end points, wild animal warning section start and end points, height limit section start and end points, and the like.

Meanwhile, the electronic apparatus 100 according to an exemplary embodiment of the present invention may include the augmented reality providing unit 160 providing an augmented reality view mode. Here, augmented reality is a method of visually overlapping and providing additional information (for example, a graphic element indicating a point of interest (POI), a graphic element indicating a route up to a destination, and the like) with and on a screen including a real world actually viewed by the user. This will be described in detail with reference to FIG. 2.

Figure 2:
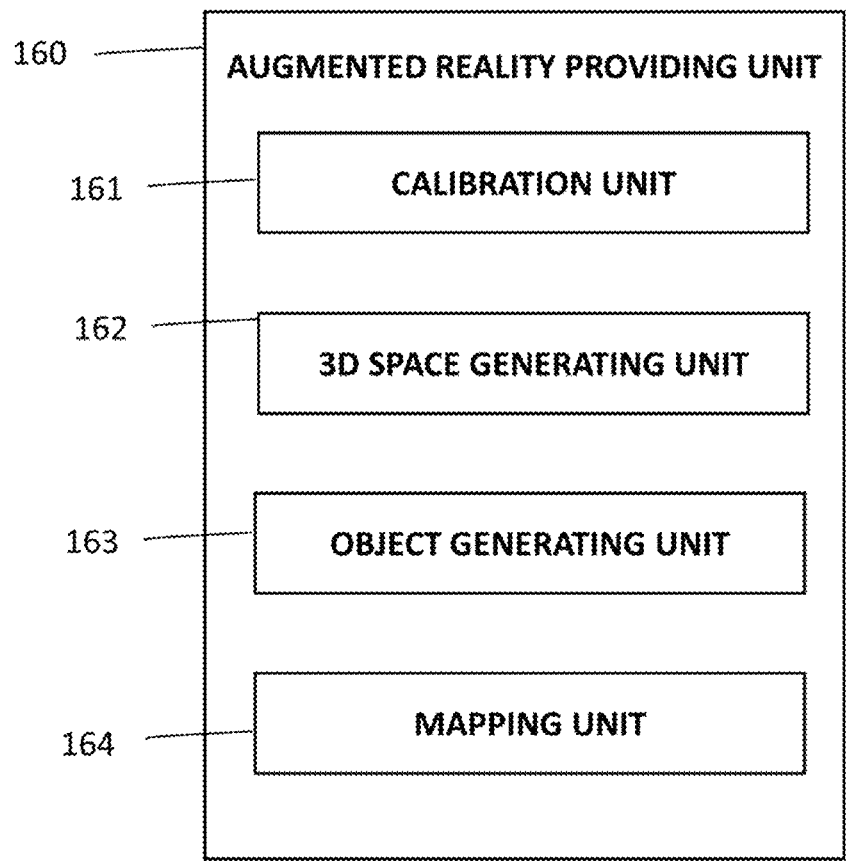
FIG. 2 is a block diagram illustrating an augmented reality providing unit according to an exemplary embodiment of the present invention in detail.

FIG. 2 is a block diagram illustrating an augmented reality providing unit 160 according to an exemplary embodiment of the present invention in detail. Referring to FIG. 2, the augmented reality providing unit 160 may include all or some of a calibration unit 161, a 3D space generating unit 162, an object generating unit 163, and a mapping unit 164.

The calibration unit 161 may perform calibration for estimating camera parameters corresponding to the camera from the photographed image photographed in the camera. Here, the camera parameters, which are parameters configuring a camera matrix, which is information indicating a relationship between a real space and a photograph, may include camera extrinsic parameters and camera intrinsic parameters.

The 3D space generating unit 162 may generate a virtual 3D space on the basis of the photographed image photographed in the camera. In detail, the 3D space generating unit 162 may generate the virtual 3D space by applying the camera parameters estimated by the calibration unit 161 to a 2D photographed image.

The object generating unit 163 may generate objects for guidance, for example, a route guidance object, a lane change guidance object, a lane departure guidance object, and the like, on the augmented reality. Particularly, the object generating unit 163 may generate an object indicating a guidance point positioned in front of the position of the vehicle by a predetermined distance. Here, the object may be implemented by a 3D object, an image, an art line, or the like.

The mapping unit 164 may map the object generated in the object generating unit 163 to the virtual 3D space generated in the 3D space generating unit 162. In detail, the mapping unit 164 may determine a position of the object generated in the object generating unit 163 on the virtual 3D space, and perform mapping of the object to the determined position.

Meanwhile, the control unit 170 controls a general operation of the electronic apparatus 100. In detail, the control unit 170 may control all or some of the storing unit 110, the input unit 120, the output unit 130, the detecting unit 140, the augmented reality providing unit 160, the communicating unit 180, and the sensing unit 190.

Particularly, when the vehicle that is being operated approaches a point within a predetermined distance from the guidance point, the control unit 170 may control the object generating unit 163 to generate the object indicating the guidance point, and control the display unit 131 to display the generated object through the augmented reality.

In detail, the control unit 170 may calculate position difference information between the position information of the vehicle obtained in the position data unit 181 and the position information of the guidance point obtained in the detecting unit 140, and decide whether or not the vehicle that is being operated has approached the point within the predetermined distance from the guidance point on the basis of the calculated position difference information.

When the vehicle that is being operated approaches the point within the predetermined distance from the guidance point, the control unit 170 may determine a position of the guidance point on the virtual 3D space generated in the 3D space generating unit 162 using the calculated position difference information. As an example, on the basis of X (latitude), Y (longitude), and Z (altitude) coordinate values on a 3D space corresponding to a real world, in the case in which the position information of the vehicle obtained in the position data unit 181 is (10, 20, 30) and the position information of the guidance point is (20, 30, 40), the control unit 170 may calculate position difference information (10, 10, 10), which is a difference of the position information. In addition, the control unit 170 may determine the position of the guidance position on the virtual 3D space generated in the 3D space generating unit 162 using the calculated position difference information.

In addition, when the vehicle that is being operated approaches the point within the predetermined distance from the guidance point, the control unit 170 may control the object generating unit 163 to generate a guidance object indicating the guidance point. In detail, the control unit 170 may control the object generating unit 163 to generate a first object indicating the position of the guidance point in the augmented reality corresponding to the real world. In addition, the control unit 170 may control the object generating unit 163 to generate a second object guiding the guidance point using the guidance code information obtained in the detecting unit 140. As an example, in the case in which the guidance point is the over-speed regulation point, the second object may include a text type of object guiding a speed limit of the over-speed regulation point and a camera image type of object guiding a regulation method of the over-speed regulation point.

Meanwhile, the control unit 170 may control the mapping unit 164 to map the guidance object generated in the object generating unit 163 on the basis of the position of the guidance position determined on the virtual 3D space.

In addition, the control unit 170 may convert the virtual 3D space to which the guidance object is mapped depending on the mapping of the mapping unit 164 into a 2D image using a camera matrix to generate a 2D augmented reality image, and control the display unit 131 to display the generated augmented reality image.

According to an exemplary embodiment of the present invention described above, an expression position of the object is stereoscopically represented on the augmented reality screen by reflecting a distance difference between the vehicle and the guidance point, thereby making it possible to more effectively transfer the distance difference between the vehicle and the guidance point to the driver.

Meanwhile, an expression position of the first object indicating the position of the guidance point in the augmented reality corresponding to the real world may be fluidly changed depending on the distance difference between the vehicle and the guidance point. For example, when the vehicle and the guidance point become close to each other depending on the driving of the vehicle, the control unit 170 may control the mapping unit 164 to map the first object while fluidly changing the position of the first object depending on the distance difference between the vehicle and the guidance point. That is, when the vehicle and the guidance point become close to each other depending on the driving of the vehicle, the first object may be expressed to be closer and closer to the vehicle on the augmented reality screen.

In addition, when the vehicle passes through the guidance point, an object indicating the guidance point through which the vehicle passes may disappear from the augmented reality screen. That is, when the vehicle passes through the guidance point depending on the driving of the vehicle, the first object indicating a position of the guidance point through which the vehicle passes and the second object indicating the guidance point through which the vehicle passes may disappear from the augmented reality screen.

According to an exemplary embodiment of the present invention described above, the expression position of the object is fluidly changed on the augmented reality screen by reflecting the distance difference between the vehicle and the guidance point, thereby making it possible to perform guidance on the driver by a more intuitive method.

Meanwhile, an expression operation of the guidance object on the augmented reality screen described above may be activated when the vehicle enters the point within a preset distance from the guidance point while being operated.

In addition, the above-mentioned guidance point may be implemented in a form in which only guidance for a single point is required, such as the over-speed regulation point, or the like, or be implemented in a form of a guidance section including the guidance start point and the guidance end point. In the case in which the guidance point is implemented in the form of the guidance section described above, the control unit 170 may control the object generating unit 163 to generate an object guiding the guidance section using information of the guidance start point and the guidance end point, and may perform a control to output the generated object through the augmented reality during a period in which the vehicle is positioned in the guidance section. For example, in the case of a section speed regulation section, when the vehicle that is being driven approaches a point within a predetermined distance from the section speed regulation start point, the control unit 170 may perform a control to output the first object indicating a position of the section speed regulation start point through the augmented reality, when the vehicle that is being driven approaches a point within a predetermined distance from the section speed regulation end point, the control unit 170 may perform a control to output the first object indicating a position of the section speed regulation end point through the augmented reality and output the second object guiding the guidance section through the augmented reality during a period in which the vehicle is positioned in the guidance section, and when the vehicle that is being driven passes through the section speed regulation end point, the control unit 170 may perform a control so that the first and second objects are not output through the augmented reality.

Figure 3:
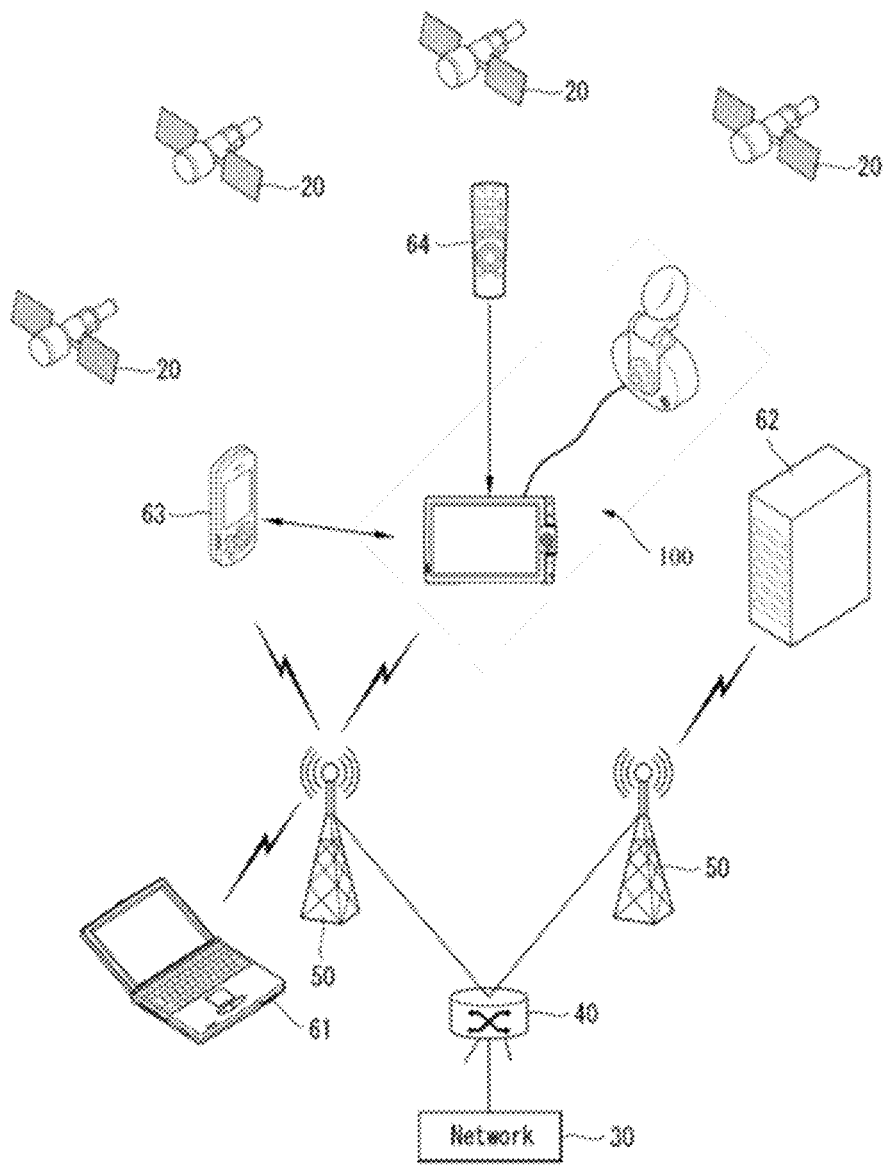
FIG. 3 is a view for describing a system network connected to an electronic apparatus according to an exemplary embodiment of the present invention.

FIG. 3 is a view for describing a system network connected to an electronic apparatus according to an exemplary embodiment of the present invention. Referring to FIG. 3, the electronic apparatus 100 according to an exemplary embodiment of the present invention may be implemented as various apparatuses provided in the vehicle, such as a navigation apparatus, a black box, a smart phone, other vehicle augmented reality interface providing apparatuses, or the like, and may be connected to various communication networks and other electronic devices 61 to 64.

In addition, the electronic apparatus 100 may interwork GPS modules with each other depending on radio signals received from artificial satellites 20 to calculate a current position and a current time.

The respective artificial satellites 20 may transmit L band frequencies of which frequency bands are different from each other. The electronic apparatus 100 may calculate the current position on the basis of a time required for the L band frequencies transmitted by the respective artificial satellites 20 to arrive at the electronic apparatus 100.

Meanwhile, the electronic apparatus 100 may wirelessly access a network 30 through an access control router (ACR) 40, a radio access station (RAS) 50, and the like, via the communicating unit 180. When the electronic apparatus 100 accesses the network 30, the electronic apparatus 100 may be indirectly connected to other electronic devices 61 and 62 accessing the network 30 to exchange data.

Meanwhile, the electronic apparatus 100 may also indirectly access the network 30 through another device 63 having a communication function. For example, in the case in which a module that may access the network 30 is not included in the electronic apparatus 100, the electronic apparatus 100 may communicate with another device 63 having the communication function through a short range communication module, or the like.

Figure 4:
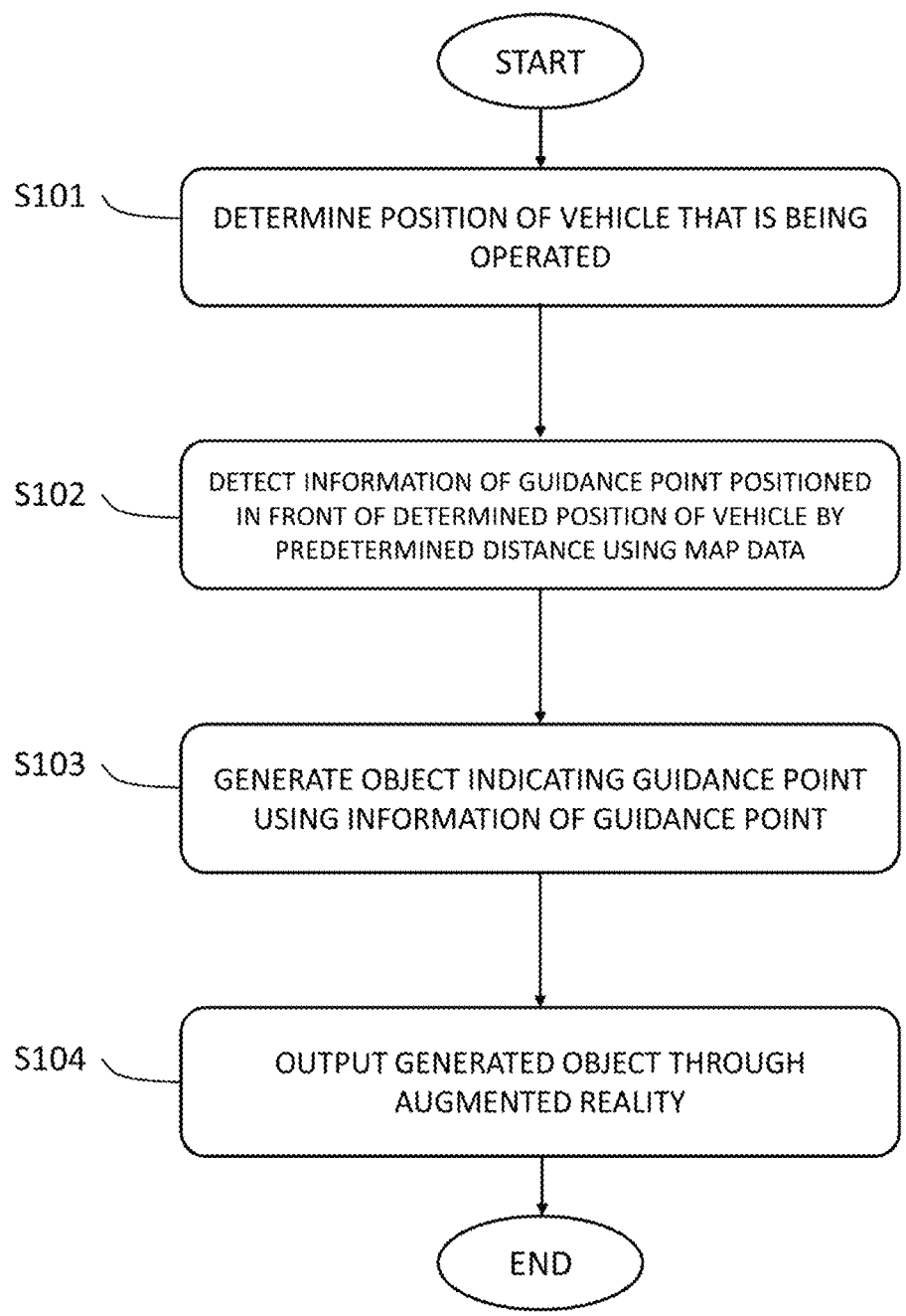
FIG. 4 is a flow chart schematically illustrating a control method of an electronic apparatus according to an exemplary embodiment of the present invention.

FIG. 4 is a flow chart schematically illustrating a control method of an electronic apparatus according to an exemplary embodiment of the present invention. Referring to FIG. 4, the electronic apparatus 100 may determine the position of the vehicle that is being operated (S101). In detail, the position data unit 181 of the electronic apparatus 100 may obtain the position data through the GPS/GNSS.

Then, the electronic apparatus 100 may detect the information of the guidance point positioned in front of the determined position of the vehicle by the predetermined distance using the map data (S102). In detail, the detecting unit 140 of the electronic apparatus 100 may apply the position information of the vehicle obtained in the position data unit 181 to the map data to detect the information of the guidance point positioned in front of the position of the vehicle by the predetermined distance. Here, the information of the guidance points may include the position information of the guidance points, the guidance code information (for example, information for guiding speed limit guidance, speed bump guidance, and the like) of the guidance points, and the like.

Then, the electronic apparatus 100 may generate the object indicating the guidance point using the information of the guidance point (S103). In detail, the object generating unit 163 of the electronic apparatus 100 may generate at least one of the first object indicating the position of the guidance point and the second object guiding the guidance point in the augmented reality corresponding to the real world. Here, the object may be implemented by a 3D object, image, or art line, or the like.

Then, the electronic apparatus 100 may display the generated object through the augmented reality (S104). In this case, the control unit 170 of the electronic apparatus 100 may calculate the position difference information between the vehicle and the guidance point, and determine a position to which the generated object is to be mapped on the virtual 3D space using the calculated position difference information, thereby outputting the generated object through the augmented reality. An output of the augmented reality screen described above will be described in detail with reference to FIGS. 5 to 6B.

Figure 5:
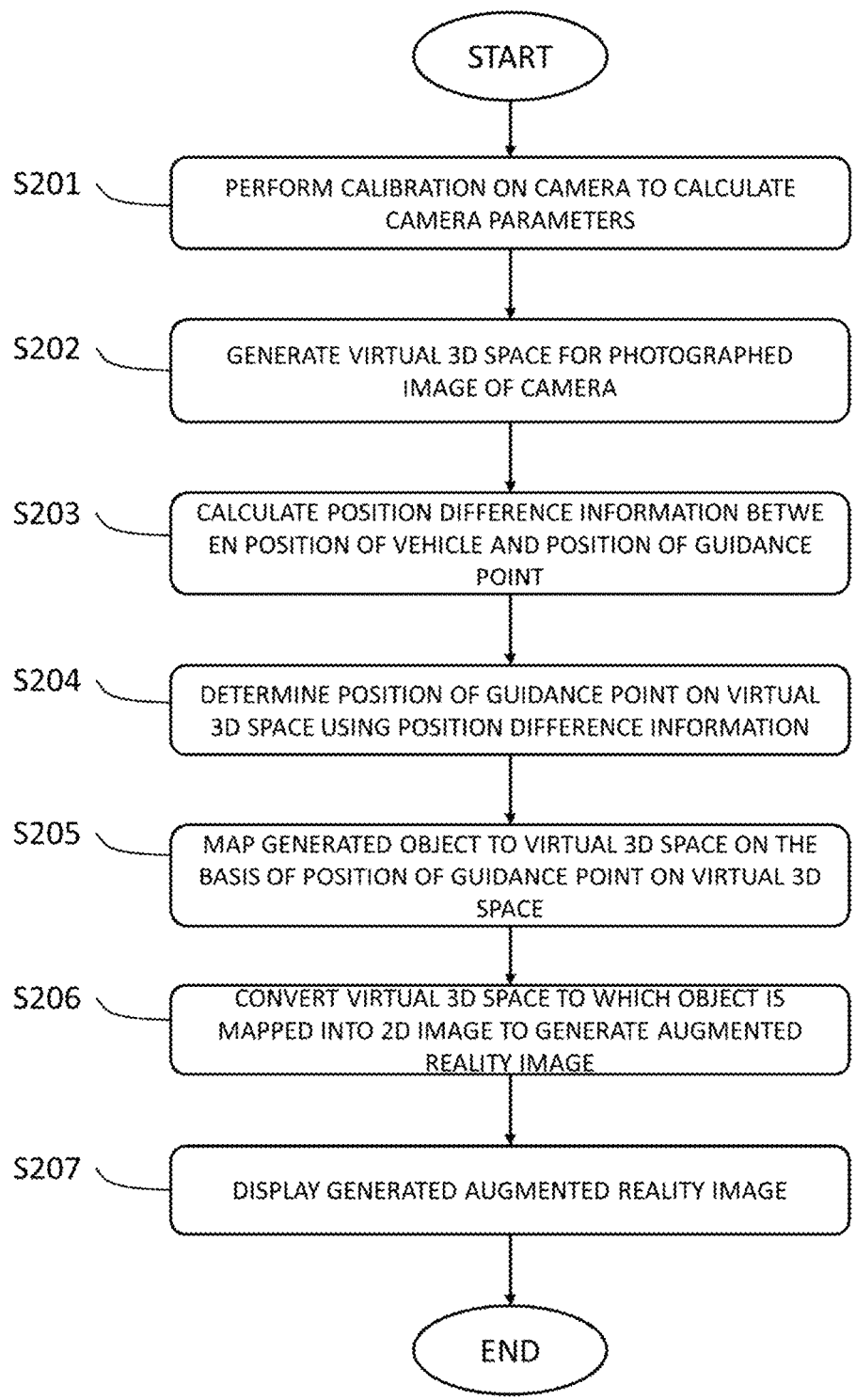
FIG. 5 is a flow chart illustrating a method of mapping an object indicating a guidance point in augmented reality according to an exemplary embodiment of the present invention in detail.
Figure 6B:
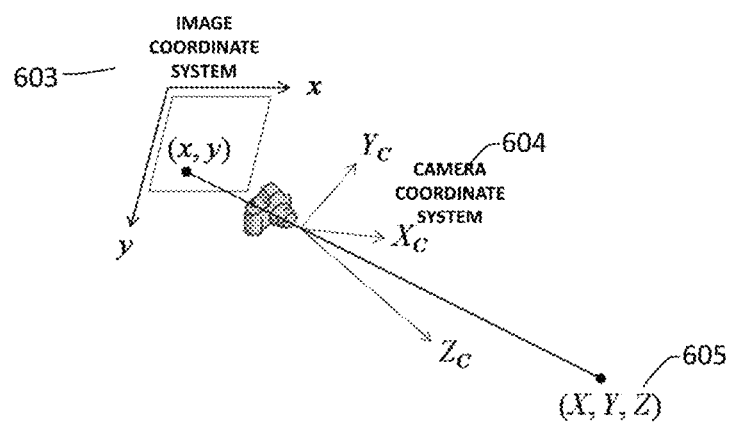

FIG. 5 is a flow chart illustrating a method of mapping an object indicating a guidance point in augmented reality according to an exemplary embodiment of the present invention in detail. FIGS. 6A and 6B are views illustrating a conversion relationship between a 2D photographed image and a virtual 3D space according to an exemplary embodiment of the present invention.

Referring to FIGS. 5 to 6B, the electronic apparatus 100 may perform the calibration on the camera to calculate the camera parameters (S201). In detail, the calibration unit 161 of the electronic apparatus 100 may perform the calibration for estimating the camera parameters corresponding to the camera from the photographed image photographed in the camera. Here, the camera parameters may be parameters configuring a camera matrix, which is information indicating a relationship between a real space and a photograph, and may include camera extrinsic parameters 601 and camera intrinsic parameters 602, as illustrated in FIG. 6A. Here, fx and fy of the camera intrinsic parameters 602 may be focal lengths, cx and cy thereof may be principal points, and skew_cfx=tan α thereof may be a skew coefficient. In addition, the camera extrinsic parameters 601 may be a rotation/movement transformation matrix for transforming a coordinate (X, Y, Z) of a 3D point on a world coordinate system 605 into a coordinate (Xc, Yc, Zc) of a 3D point of a camera coordinate system 604. Since the camera extrinsic parameters are not unique parameters of the camera, they may be changed depending on at which position and in which direction the camera is installed, and may be changed depending on how the world coordinate system is defined.

Then, the electronic apparatus 100 may generate the virtual 3D space for the photographed image of the camera on the basis of the camera parameters (S202). In detail, the 3D space generating unit 162 of the electronic apparatus 100 may generate the virtual 3D space by applying the camera parameters estimated by the calibration unit 161 to a 2D photographed image. That is, referring to FIG. 6B, the photographed image of the camera may be obtained by perspective projection of points on a 3D space of the world coordinate system 605 onto a 2D image plane of an image coordinate system 603. Therefore, the 3D space generating unit 162 of the electronic apparatus 100 may generate a virtual 3D space of the world coordinate system 605 for the photographed image of the camera by performing an inverse process to the above-mentioned operation on the basis of the camera parameters.

Then, the electronic apparatus 100 may calculate the position difference information between the position of the vehicle and the position of the guidance point (S203). In detail, the control unit 170 of the electronic apparatus 100 may calculate the position difference information between the position information of the vehicle obtained in the position data unit 181 and the position information of the guidance point obtained in the detecting unit 140. As an example, in the case in which the position information of the vehicle obtained in the position data unit 181 is (10, 20, 30) and the position information of the guidance point is (20, 30, 40), the control unit 170 may calculate the position difference information (10, 10, 10).

Then, the electronic apparatus 100 may determine the position of the guidance point on the virtual 3D space using the position difference information (S204). In detail, when the position difference information, which is the difference between the position of the guidance point and the position of the vehicle, is calculated, a coordinate of the position difference information on the virtual 3D space of the world coordinate system 605 may be calculated to determine the position of the guidance point in the virtual 3D space.

Then, the electronic apparatus 100 may map the generated object to the virtual 3D space on the basis of the position of the guidance point on the virtual 3D space (S205).

Then, the electronic apparatus 100 may convert the virtual 3D space to which the object is mapped into the 2D image to generate the augmented reality image (S206). In detail, the control unit 170 of the electronic apparatus 100 may convert the virtual 3D space to which the guidance object is mapped depending on the mapping of the mapping unit 164 into the 2D image using the camera matrix to generate a 2D augmented reality image.

Then, the electronic apparatus 100 may display the generated augmented reality image (S207).

Figure 7:
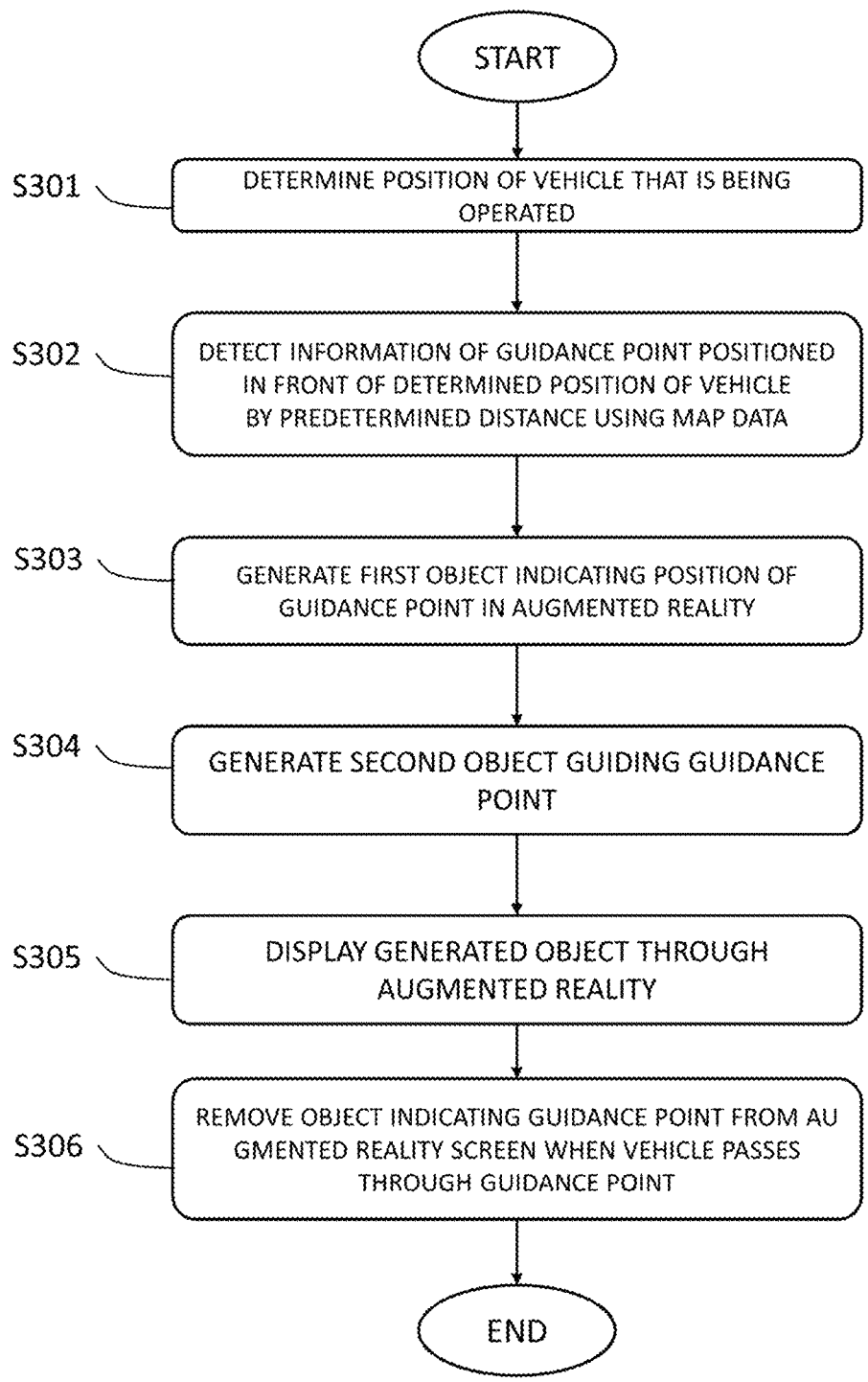
FIG. 7 is a flow chart illustrating a method of displaying an augmented reality screen of an electronic apparatus according to an exemplary embodiment of the present invention in detail.

FIG. 7 is a flow chart illustrating a method of displaying an augmented reality screen of an electronic apparatus according to an exemplary embodiment of the present invention in detail. Referring to FIG. 7, the electronic apparatus 100 may determine the position of the vehicle that is being operated (S301).

Then, the electronic apparatus 100 may detect the information of the guidance point positioned in front of the determined position of the vehicle by the predetermined distance using the map data (S302).

Then, the electronic apparatus 100 may generate the first object indicating the position of the guidance point in the augmented reality corresponding to the real world using the position information of the guidance point (S303).

Then, the electronic apparatus 100 may generate the second object guiding the guidance point using the guidance code information of the guidance point (S304).

Then, the electronic apparatus 100 may display the generated object through the augmented reality (S305).

Then, the electronic apparatus 100 may remove the object indicating the guidance point through which the vehicle passes from the augmented reality screen (S306) when the vehicle passes through the guidance point.

Hereinafter, augmented reality screens according to various exemplary embodiments of the present invention will be described in detail with reference to FIGS. 8A to 15.

Figure 8A:
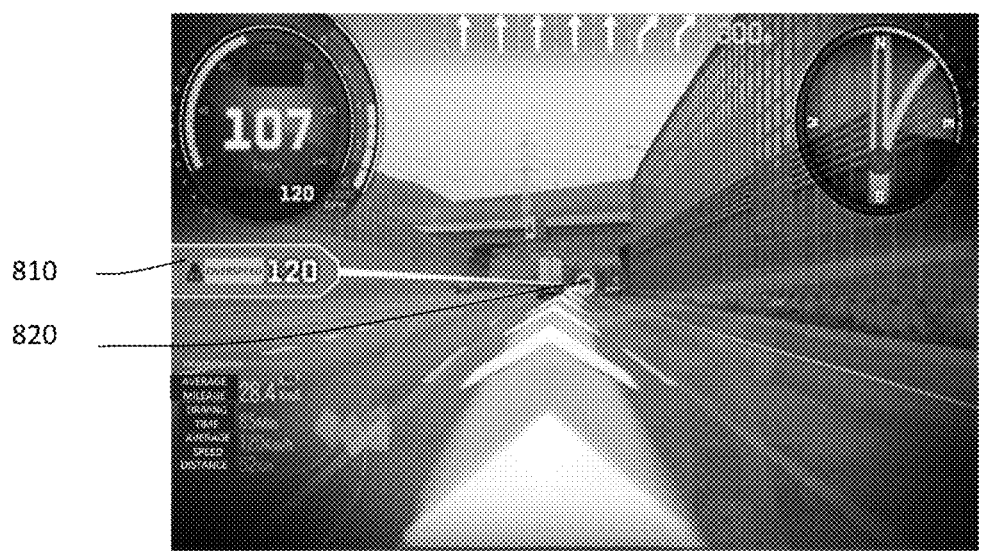
FIGS. 8A to 8C are views illustrating augmented reality screens displaying an over-speed regulation point according to an exemplary embodiment of the present invention.
Figure 8B:
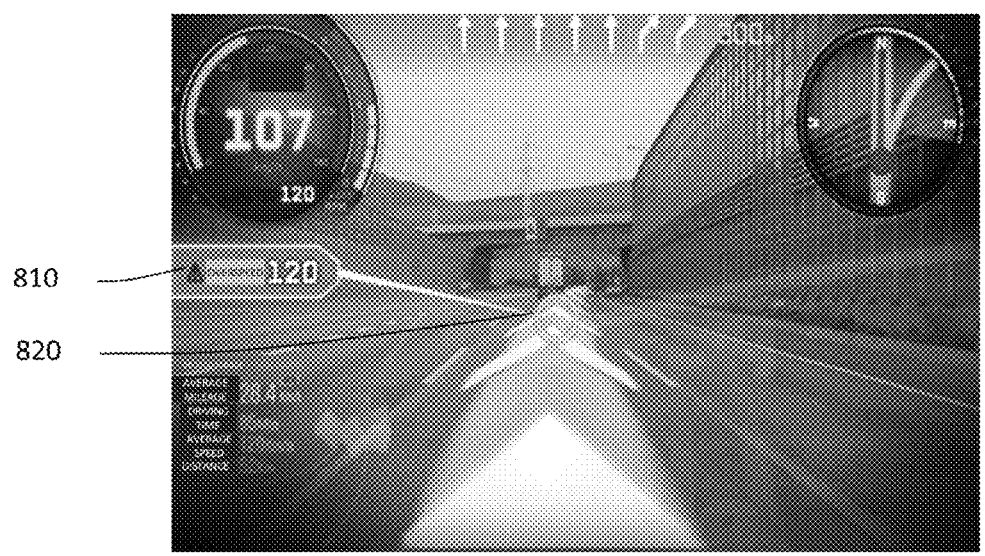
Figure 8C:
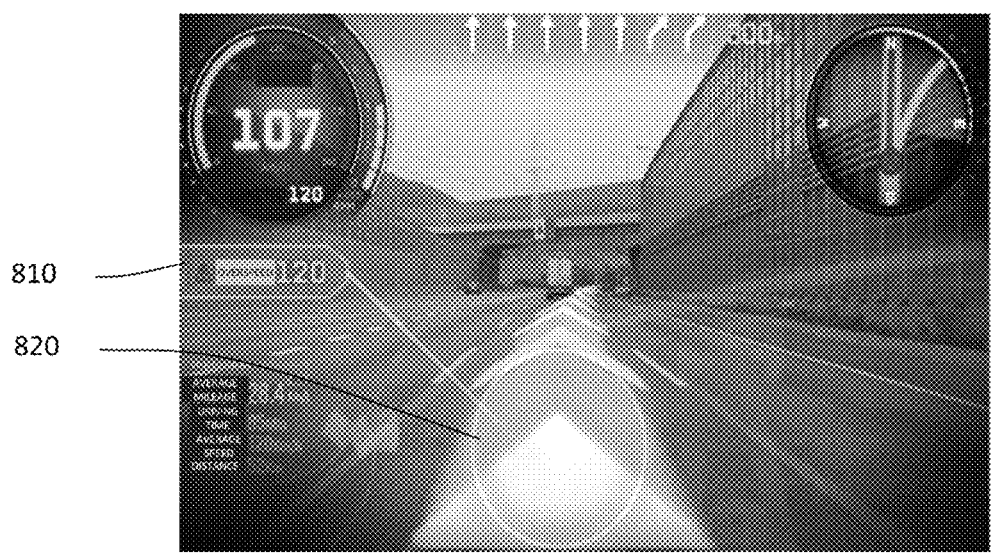

FIGS. 8A to 8C are views illustrating augmented reality screens displaying an over-speed regulation point according to an exemplary embodiment of the present invention. Referring to FIGS. 8A to 8C, the electronic apparatus 100 may display a first object 820 indicating a position of an over-speed regulation point in augmented reality corresponding to a real world and a second object 810 including a text guiding a speed limit of the over-speed regulation point through the augmented reality.

Particularly, referring to FIGS. 8A to 8C, an expression position of the first object 820 may be fluidly changed depending on a distance difference between the vehicle and the guidance point. That is, when the vehicle and the guidance point become close to each other depending on the driving of the vehicle, the first object 820 may be expressed to be closer and closer to the vehicle on the augmented reality screen.

In addition, when the vehicle and the guidance point become very close to each other depending on the driving of the vehicle, transparency of the first and second objects is adjusted, such that the first and second objects may be transparently expressed as illustrated in FIG. 8C.

Meanwhile, although not illustrated in FIGS. 8A to 8C, when the vehicle passes through the guidance point, the first and second objects indicating the guidance point through which the vehicle passes may disappear from the augmented reality screen.

Figure 9A:
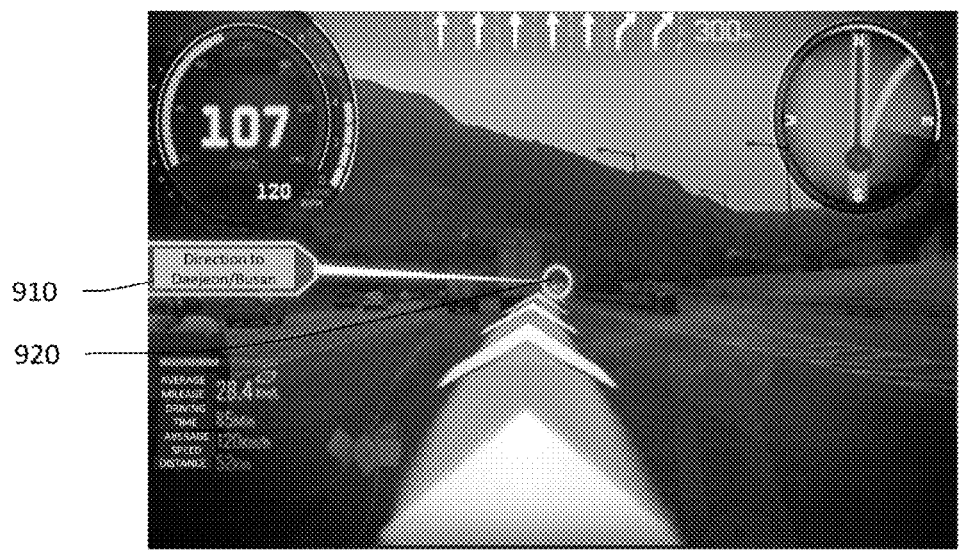
FIGS. 9A and 9B are views illustrating augmented reality screens displaying a branch point and an intermediate point according to an exemplary embodiment of the present invention.
Figure 9B:
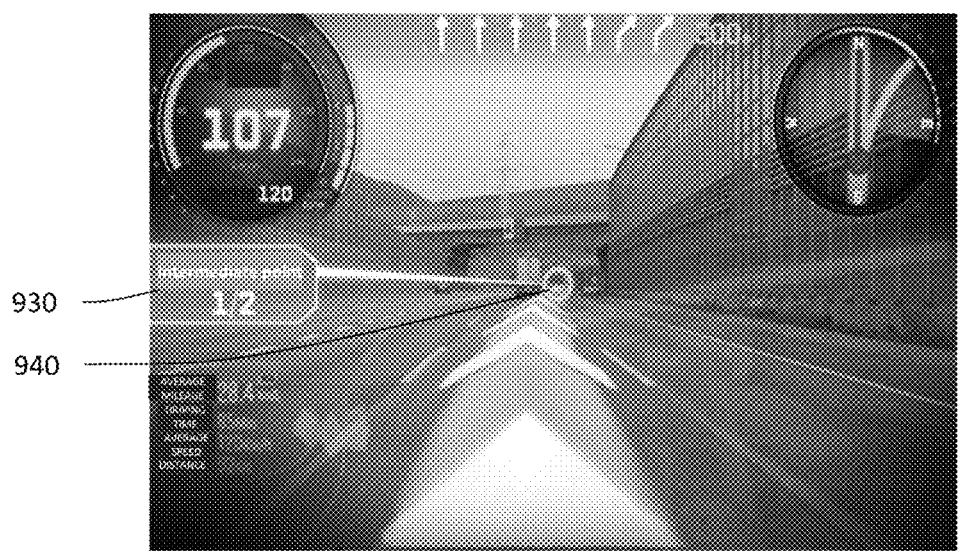

FIGS. 9A and 9B are views illustrating augmented reality screens displaying a branch point and an intermediate point according to an exemplary embodiment of the present invention. Referring to FIG. 9A, the electronic apparatus 100 may display a first object 920 indicating a position of a branch point positioned in a driving route of a vehicle in augmented reality corresponding to a real world and a second object 910 including a text guiding a direction of the branch point through the augmented reality. In addition, referring to FIG. 9B, the electronic apparatus 100 may display a first object 940 indicating a position of an intermediate point positioned in a driving route of a vehicle in augmented reality corresponding to a real world and a second object 930 including a text guiding the intermediate point through the augmented reality.

Figure 10A:
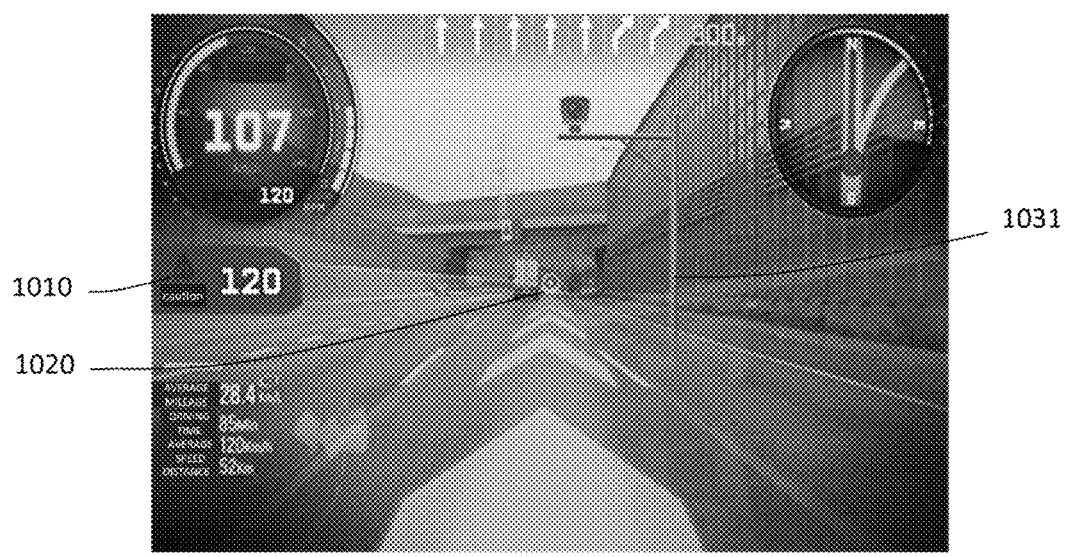
FIGS. 10A to 10C are views illustrating augmented reality screens displaying an over-speed regulation point according to an exemplary embodiment of the present invention.
Figure 10B:
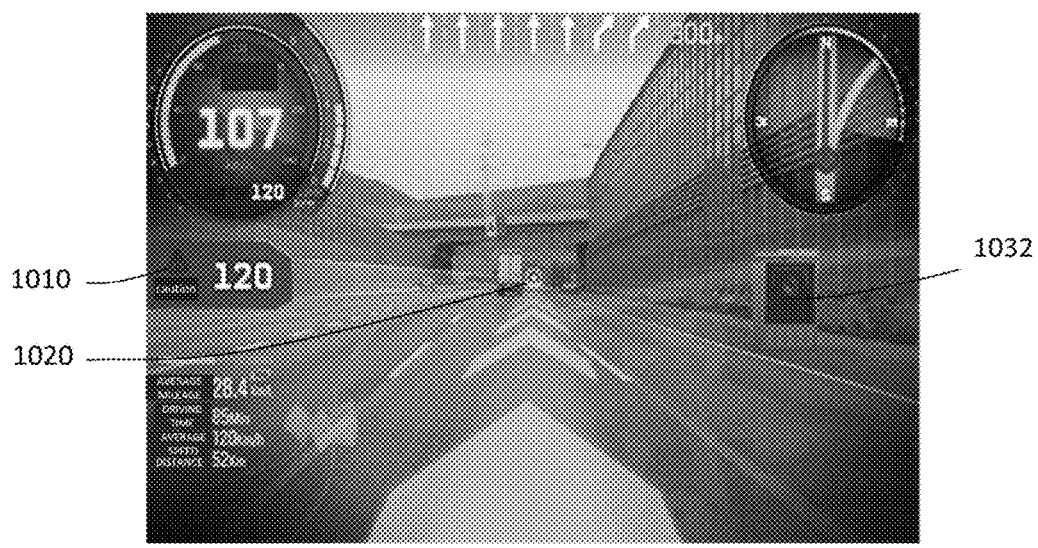
Figure 10C:
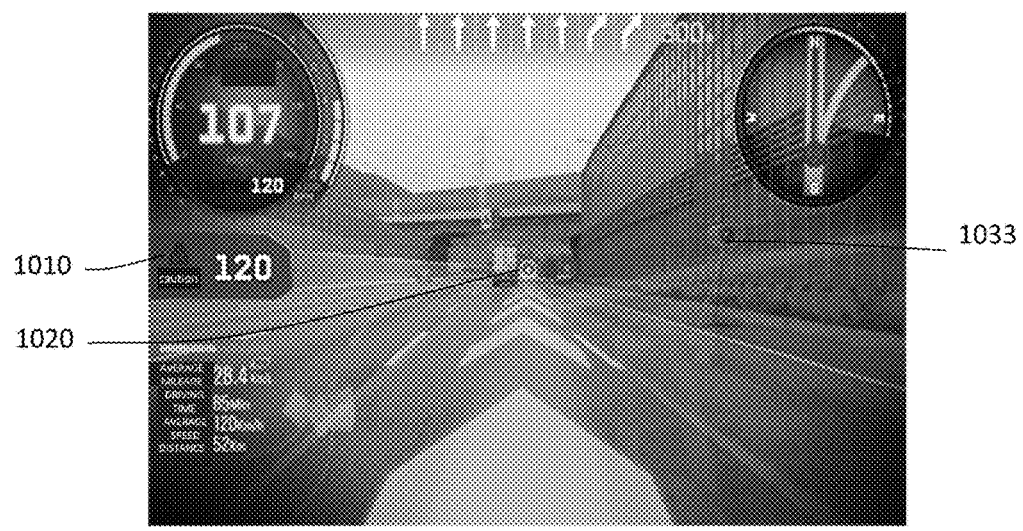

FIGS. 10A to 10C are views illustrating augmented reality screens displaying an over-speed regulation point according to an exemplary embodiment of the present invention. Referring to FIGS. 10A to 10C, the electronic apparatus 100 may display a first object 1020 indicating a position of an over-speed regulation point in augmented reality corresponding to a real world, a second object 1010 including a text guiding a speed limit of the over-speed regulation point, and a third object 1031, 1032, or 1033 including an image guiding a regulation method of the over-speed regulation point through the augmented reality.

In more detail, the electronic apparatus 100 may display the object 1031 as illustrated in FIG. 10A in the case in which the regulation method of the over-speed regulation point is a fixed camera, the object 1032 as illustrated in FIG. 10B in the case in which the regulation method of the over-speed regulation point is a box type camera, and the object 1033 as illustrated in FIG. 10C in the case in which the regulation method of the over-speed regulation point is a movable camera through the augmented reality.

Figure 11A:
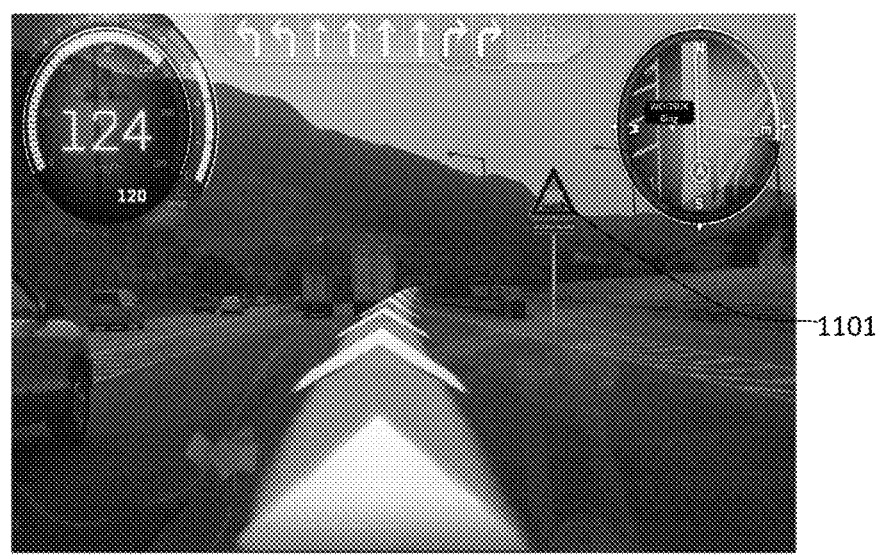
FIGS. 11A and 11B are views illustrating augmented reality screens displaying a road traffic sign according to an exemplary embodiment of the present invention.
Figure 11B:
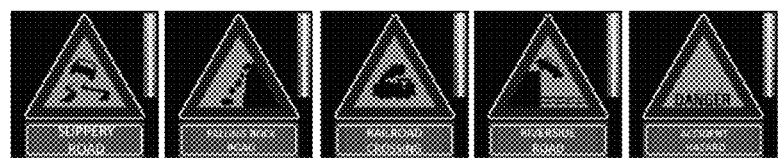

FIGS. 11A and 11B are views illustrating augmented reality screens displaying a road traffic sign according to an exemplary embodiment of the present invention. Referring to FIGS. 11A and 11B, the electronic apparatus 100 may display a road traffic sign object 1101 (for example, a sign indicating an accident hazard section, a sign indicating a slippery road, a railroad crossing sign, a riverside road sign, or the like, as illustrated in FIG. 11B) requesting caution of the driver in augmented reality corresponding to a real world through the augmented reality.

In this case, the control unit 170 of the electronic apparatus 100 may perform a control so that the road traffic sign object 1101 is expressed on a region of a road that is not a driving road of the vehicle.

Figure 12A:
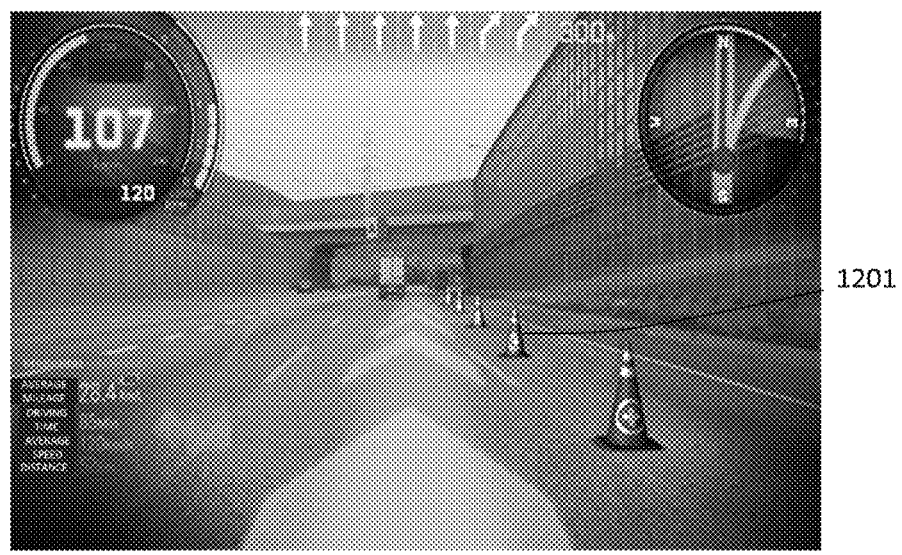
FIGS. 12A and 12B are views illustrating augmented reality screens displaying a construction section and a fog warning section according to an exemplary embodiment of the present invention.
Figure 12B:
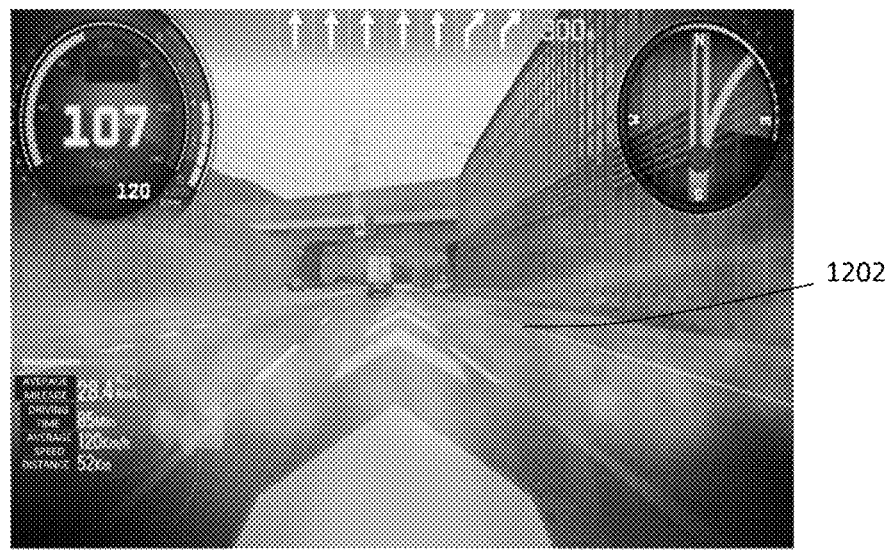

FIGS. 12A and 12B are views illustrating augmented reality screens displaying a construction section and a fog warning section according to an exemplary embodiment of the present invention. Referring to FIG. 12A, the electronic apparatus 100 may display an object 1201 including an image guiding a construction section through augmented reality. Alternatively, referring to FIG. 12B, the electronic apparatus 100 may display an object 1202 including an image guiding a fog warning section through augmented reality.

These objects 1201 and 1202 guiding a guidance section may be displayed through the augmented reality only during a period in which the vehicle is positioned in the guidance section.

In addition, although not illustrated in FIGS. 12A and 12B, according to an exemplary embodiment of the present invention, in the case in which the vehicle approaches a guidance start point and a guidance end point of the guidance section, an object indicating a position of the guidance start point and an object indicating a position of the guidance end point may be displayed through the augmented reality.

Figure 13A:
FIGS. 13A to 13C are views illustrating augmented reality screens displaying an accident hazard warning section, a falling warning section, and a falling rock warning section according to an exemplary embodiment of the present invention.
Figure 13B:
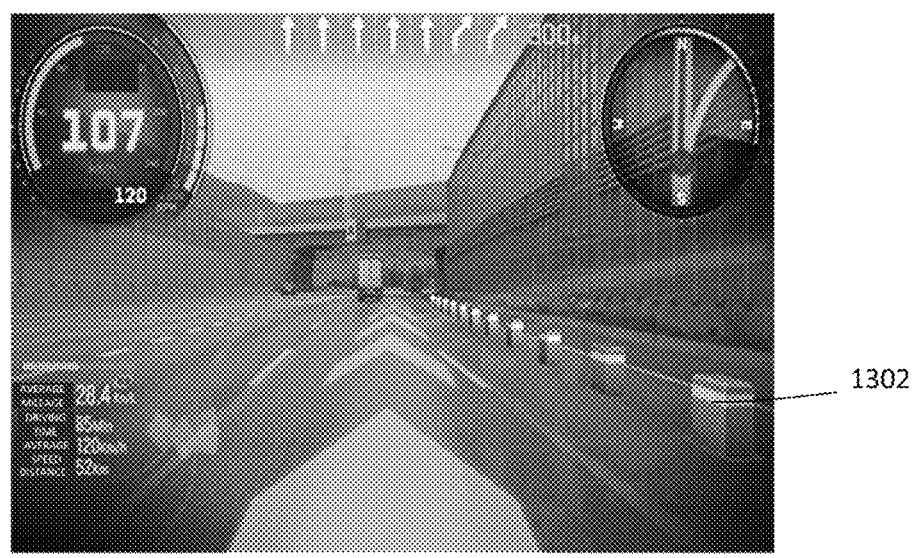
Figure 13C:
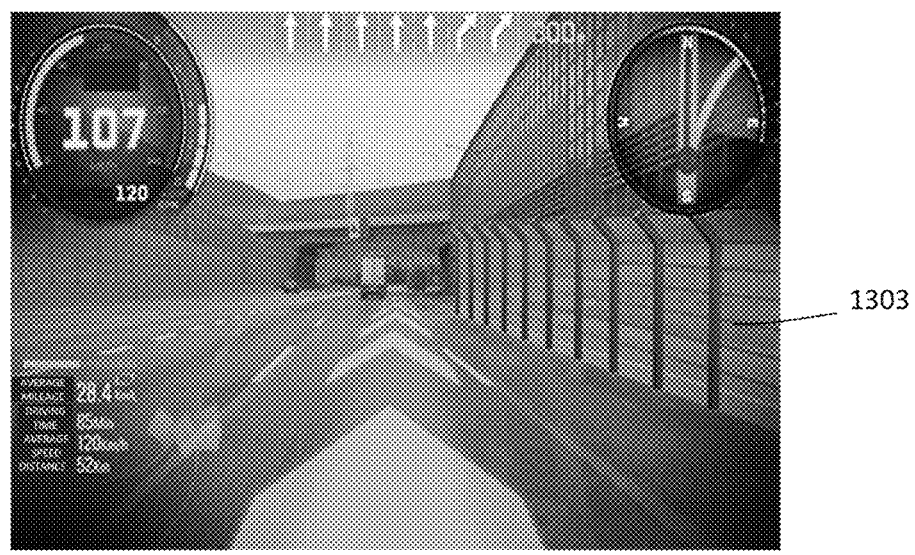

FIGS. 13A to 13C are views illustrating augmented reality screens displaying an accident hazard warning section, a falling warning section, and a falling rock warning section according to an exemplary embodiment of the present invention. Referring to FIG. 13A, the electronic apparatus 100 may display an object 1301 including an image guiding an accident hazard warning section through augmented reality. Alternatively, referring to FIG. 13B, the electronic apparatus 100 may display an object 1302 including an image guiding a falling warning section through augmented reality. Alternatively, referring to FIG. 13C, the electronic apparatus 100 may display an object 1303 including an image guiding a falling rock warning section through augmented reality.

Figure 14A:
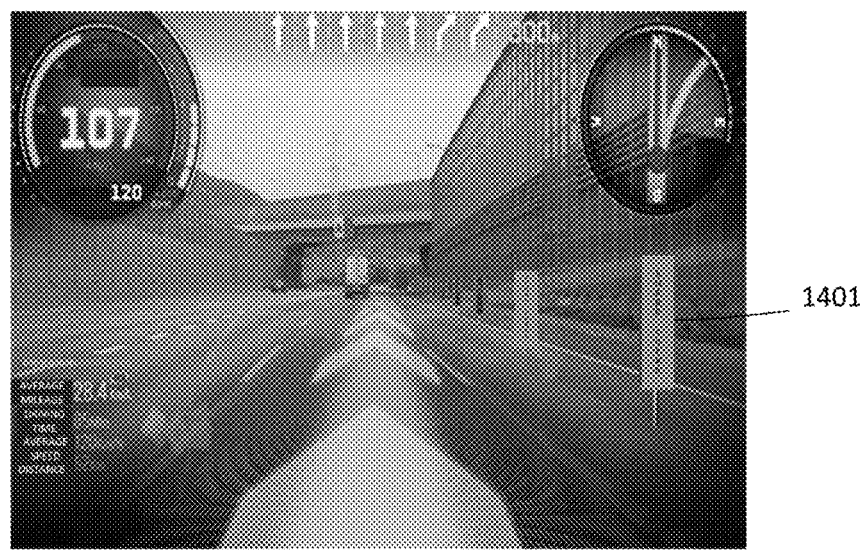
FIGS. 14A to 14C are views illustrating augmented reality screens displaying a sharp curve warning section, a slippery surface warning section, and a wild animal warning section according to an exemplary embodiment of the present invention.
Figure 14B:
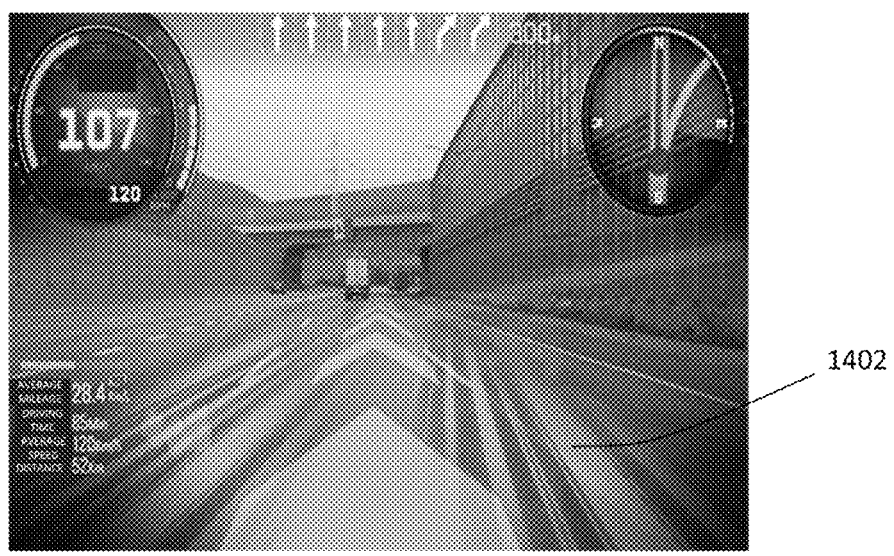
Figure 14C:
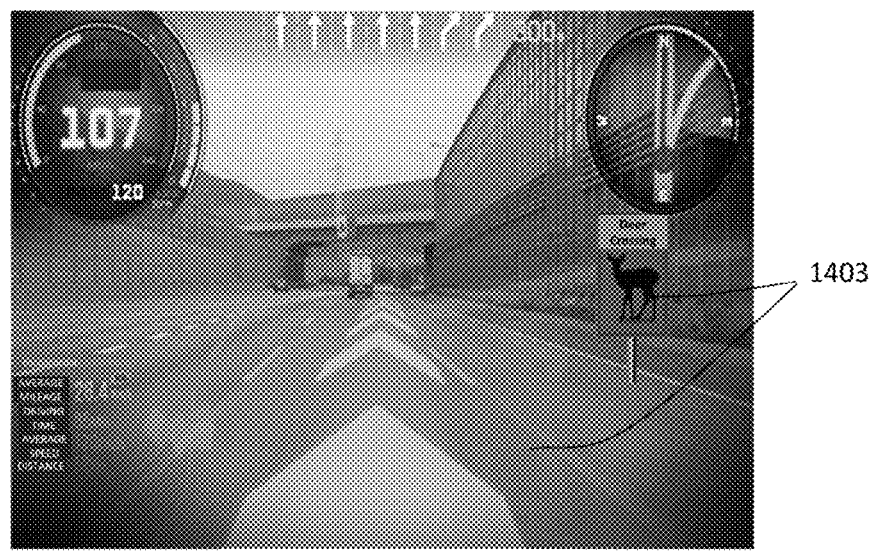

FIGS. 14A to 14C are views illustrating augmented reality screens displaying a sharp curve warning section, a slippery surface warning section, and a wild animal warning section according to an exemplary embodiment of the present invention. Referring to FIG. 14A, the electronic apparatus 100 may display an object 1401 including an image guiding a sharp curve warning section through augmented reality. Alternatively, referring to FIG. 14B, the electronic apparatus 100 may display an object 1402 including an image guiding a slippery surface warning section through augmented reality. Alternatively, referring to FIG. 14C, the electronic apparatus 100 may display an object 1403 including an image guiding a wild animal warning section through augmented reality.

Figure 15:
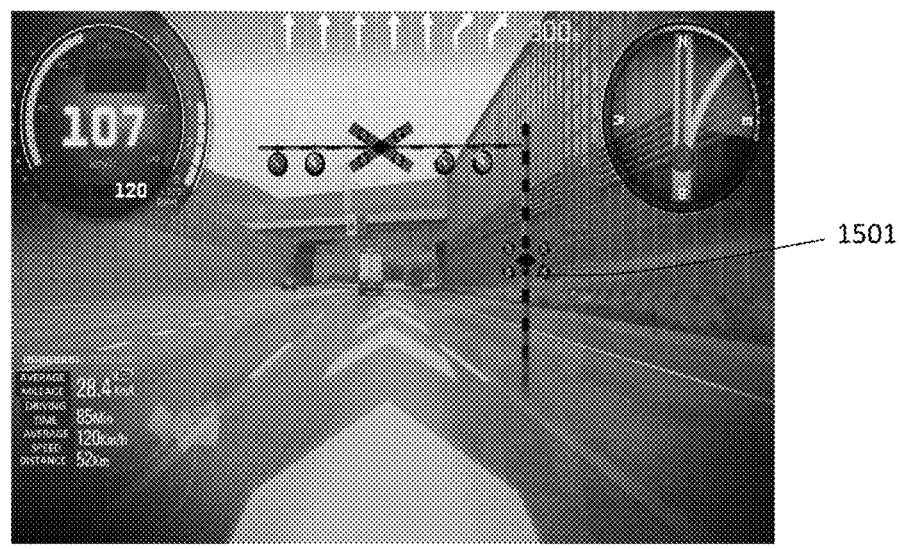
FIG. 15 is a view illustrating an augmented reality screen displaying a railroad crossing point according to an exemplary embodiment of the present invention.

FIG. 15 is a view illustrating an augmented reality screen displaying a railroad crossing point according to an exemplary embodiment of the present invention. Referring to FIG. 15, the electronic apparatus 100 may display an object 1501 including an image guiding a railroad crossing point through augmented reality.

According to various exemplary embodiments of the present invention described above, an expression position of the object is stereoscopically represented on the augmented reality screen by reflecting a distance difference between the vehicle and the guidance point, thereby making it possible to more effectively transfer the distance difference between the vehicle and the guidance point to the driver.

In addition, the expression position of the object is fluidly changed on the augmented reality screen by reflecting the distance difference between the vehicle and the guidance point, thereby making it possible to perform guidance on the driver by a more intuitive method.

In addition, a position and guidance information of a point in a speed violation regulation section, a section speed regulation section, a slippery surface warning section, or the like, are dynamically expressed by an augmented reality method, thereby making it possible to provide effective guidance to the driver, cause an interest of the driver, and promote safety driving and convenience of the driver for the vehicle.

Figure 16:
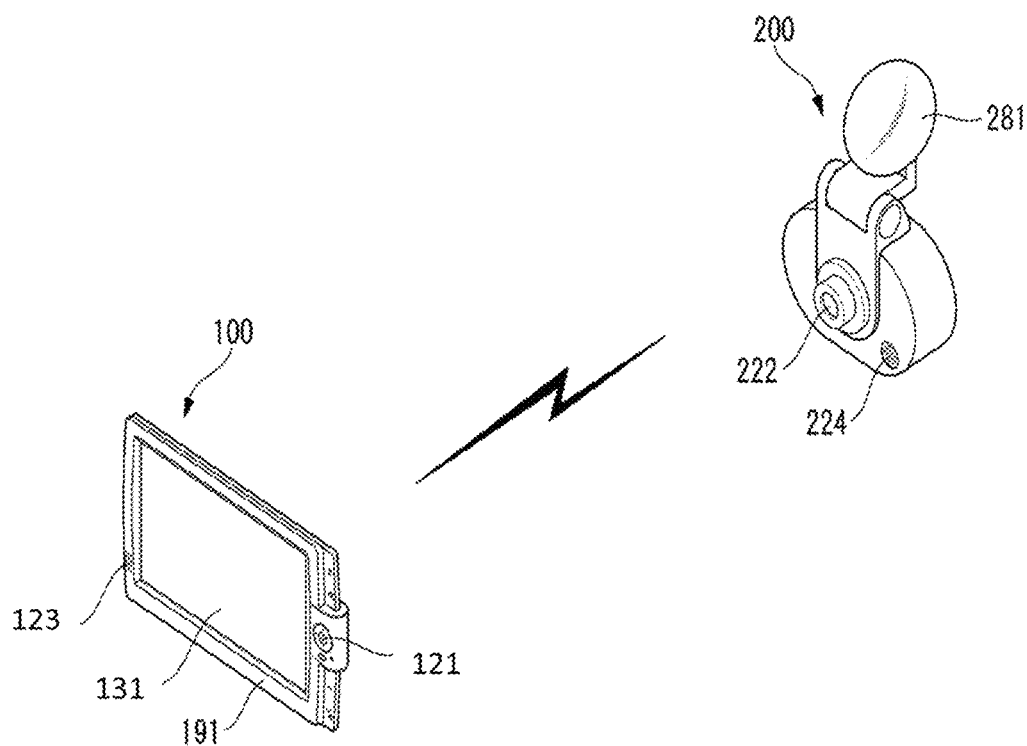
FIG. 16 is a view illustrating an implementation in the case in which a camera and an electronic apparatus according to an exemplary embodiment of the present invention are separated from each other.

FIG. 16 is a view illustrating an implementation in the case in which a navigation apparatus according to an exemplary embodiment of the present invention does not include a photographing unit. Referring to FIG. 16, a navigation apparatus 100 for a vehicle and a separately provided black box 200 for a vehicle may configure a system according to an exemplary embodiment of the present invention using a wired/wireless communication scheme.

The navigation apparatus 100 for a vehicle may include a display unit 131 provided on a front surface of a navigation housing 191, a navigation manipulation key 121, and a navigation microphone 123.

The black box 200 for a vehicle may include a black box camera 222, a black box microphone 224, and an attaching part 281.

Figure 17:
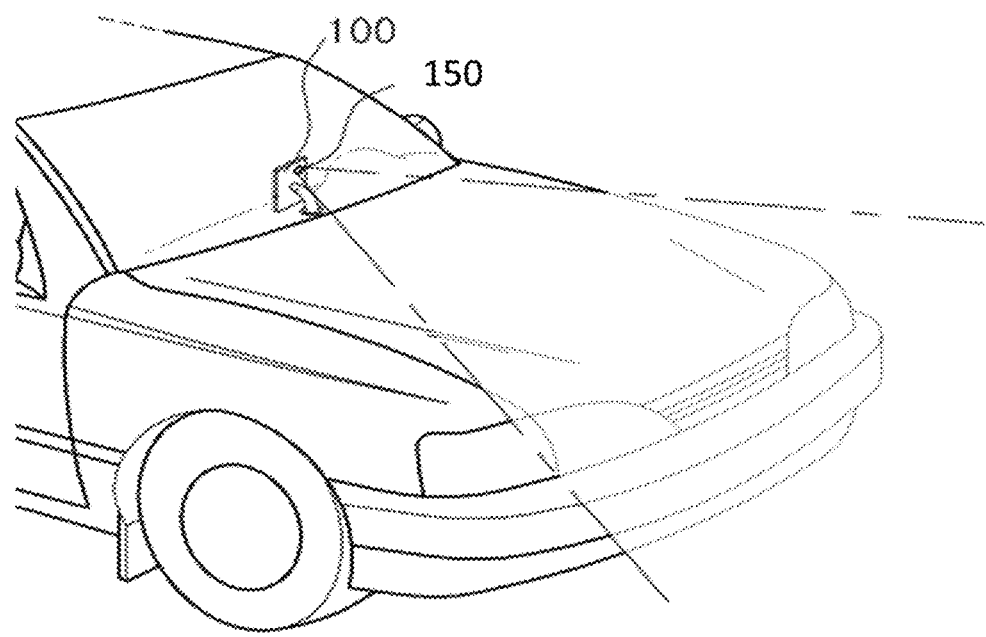
FIG. 17 is a view illustrating an implementation in the case in which a camera and an electronic apparatus according to an exemplary embodiment of the present invention are integrated with each other.

FIG. 17 is a view illustrating an implementation in the case in which a navigation apparatus according to an exemplary embodiment of the present invention includes a photographing unit. Referring to FIG. 17, in the case in which the navigation apparatus 100 includes the photographing unit 150, the user may mount the navigation apparatus 100 so that the photographing unit 150 of the navigation apparatus 100 photographs the front of the vehicle and the display unit of the navigation apparatus 100 may be recognized by the user. Therefore, a system according to an exemplary embodiment of the present invention may be implemented.

Figure 18:
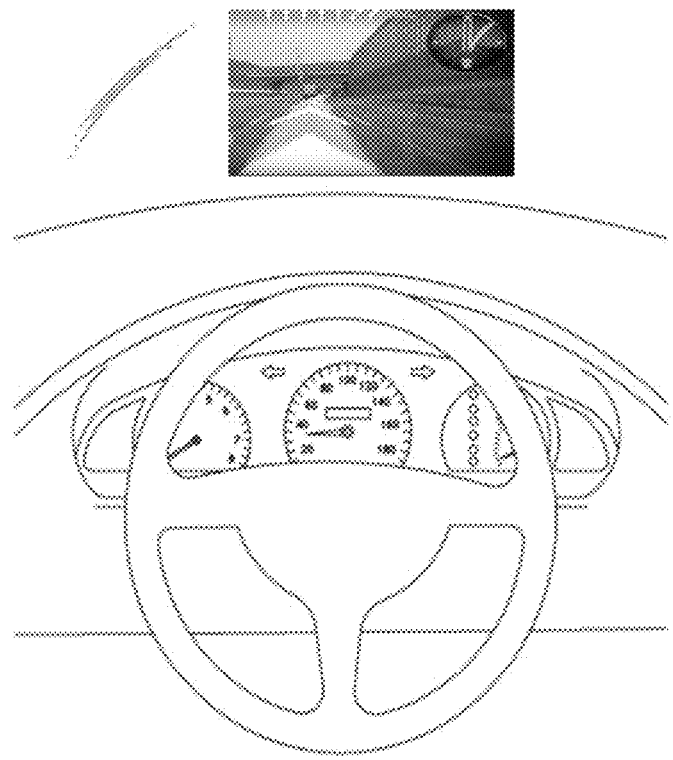
FIG. 18 is a view illustrating an implementation using a head-up display (HUD) and an electronic apparatus according to an exemplary embodiment of the present invention.

FIG. 18 is a view illustrating an implementation using a head-up display (HUD) according to an exemplary embodiment of the present invention. Referring to FIG. 18, the HUD may display an augmented reality guidance screen thereon through wired/wireless communication with other devices.

As an example, the augmented reality may be provided through the HUD using a front glass of the vehicle, an image overlay using a separate image output apparatus, or the like, and the augmented reality providing unit 160 may generate an interface image overlaid on the augmented reality image or the glass as described above, or the like. Through this, an augmented reality navigation apparatus, a vehicle infotainment system, or the like, may be implemented.

According to various exemplary embodiments of the present invention described above, an expression position of the object is stereoscopically represented on the augmented reality screen by reflecting a distance difference between the vehicle and the guidance point, thereby making it possible to more effectively transfer the distance difference between the vehicle and the guidance point to the driver.

In addition, according to various exemplary embodiments of the present invention described above, the expression position of the object is fluidly changed on the augmented reality screen by reflecting the distance difference between the vehicle and the guidance point, thereby making it possible to perform guidance on the driver by a more intuitive method.

Further, according to various exemplary embodiments of the present invention described above, a position and guidance information of a point in a speed violation regulation section, a section speed regulation section, a slippery surface warning section, or the like, are dynamically expressed by an augmented reality method, thereby making it possible to provide effective guidance to the driver, cause an interest of the driver, and promote safety driving and convenience of the driver for the vehicle.

Meanwhile, the control methods according to various exemplary embodiments of the present invention described above may be implemented as programs and be provided to servers or devices. Therefore, the respective apparatuses may access the servers or the devices in which the programs are stored to download the programs.

In addition, the control method according to various exemplary embodiments of the present invention described above may be implemented as programs and be provided in a state in which it is stored in various non-transitory computer-readable media. The non-transitory computer-readable medium is not a medium that stores data therein for a while, such as a register, a cache, a memory, or the like, but means a medium that semi-permanently stores data therein and is readable by a device. In detail, various applications or programs described above may be stored and provided in the non-transitory computer-readable medium such as a compact disk (CD), a digital versatile disk (DVD), a hard disk, a Blu-ray disk, a universal serial bus (USB), a memory card, a read only memory (ROM), or the like.

Although exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. A control method of an electronic apparatus, comprising:
   determining a position of a vehicle that is being operated;
   detecting information of a guidance point positioned in front of the determined position of the vehicle by a predetermined distance using a map data;
   generating, by a control unit including a processor, an object indicating the guidance point using the information of the guidance point;
   calculating, by the control unit, position difference information between the position of the vehicle and a position of the guidance point in augmented reality;
   determining, by the control unit, a position of the guidance point on a virtual three-dimensional (3D) space using the calculated position difference information;
   mapping, by the control unit, the generated object to the virtual 3D space based on the determined position of the guidance point;
   converting, by the control unit, the virtual 3D space to which the object indicating the guidance point is mapped into a 2D image to generate a 2D augmented reality image; and
   controlling, by the control unit, to display the generated 2D augmented reality image on a display unit.

2. The control method of the electronic apparatus of claim 1, further comprising:
   performing calibration on a camera to calculate camera parameters; and generating the virtual 3D space for a photographed image of the camera on basis of the camera parameters.

3. The control method of the electronic apparatus of claim 1, wherein the object indicating the guidance point includes a first object indicating the position of the guidance point in the augmented reality corresponding to a real world.

4. The control method of the electronic apparatus of claim 3, wherein an expression position of the first object is fluidly changed depending on a distance difference between the vehicle and the guidance point.

5. The control method of the electronic apparatus of claim 3, wherein the object indicating the guidance point further includes a second object guiding the guidance point.

6. The control method of the electronic apparatus of claim 1, wherein when the vehicle passes through the guidance point, the object indicating the guidance point through which the vehicle passes disappears from the augmented reality.

7. The control method of the electronic apparatus of claim 1, wherein the outputting is activated when the vehicle enters a point within a preset distance from the guidance point while being operated.

8. The control method of the electronic apparatus of claim 1, wherein in a case in which the guidance point is implemented as a guidance section including a guidance start point and a guidance end point,
   in the generating, an object guiding the guidance section is generated using information of the guidance start point and the guidance end point, and
   in the outputting, the generated object is output through the augmented reality during a period in which the vehicle is positioned in the guidance section.

9. An electronic apparatus comprising:
   a display unit displaying a screen;
   a detecting unit, including a processor, detecting information of a guidance point positioned in front of a position of a vehicle that is being operated by a predetermined distance using a map data;
   an object generating unit, including a processor, generating an object indicating the guidance point using the information of the guidance point; and
   a control unit, including a processor,
      calculating position difference information between the position of the vehicle and a position of the guidance point in augmented reality,
      determining a position of the guidance point on a virtual three-dimensional (3D) space using the calculated position difference information,
      mapping the generated object to the virtual 3D space based on the determined position of the guidance point,
      converting the virtual 3D space to which the object indicating the guidance point is mapped into a 2D image to generate a 2D augmented reality image, and
      controlling the display unit to display the generated 2D augmented reality image.

10. The electronic apparatus of claim 9, further comprising:
    a calibration unit, including a processor, performing calibration on a camera to calculate camera parameters;
    a 3D space generating unit, including a processor, generating the virtual 3D space for a photographed image of the camera on basis of the camera parameters; and
    a mapping unit, including a processor, mapping the generated object to the generated virtual 3D space.

11. The electronic apparatus of claim 9, wherein the object indicating the guidance point includes a first object indicating the position of the guidance point in the augmented reality corresponding to a real world.

12. The electronic apparatus of claim 11, wherein an expression position of the first object is fluidly changed depending on a distance difference between the vehicle and the guidance point.

13. The electronic apparatus of claim 11, wherein the object indicating the guidance point further includes a second object guiding the guidance point.

14. The electronic apparatus of claim 9, wherein when the vehicle passes through the guidance point, the object indicating the guidance point through which the vehicle passes disappears from the augmented reality.

15. The electronic apparatus of claim 9, wherein expression of the object in the augmented reality is activated when the vehicle enters a point within a preset distance from the guidance point while being operated.

16. The electronic apparatus of claim 9, wherein in a case in which the guidance point is implemented as a guidance section including a guidance start point and a guidance end point,
- the object generating unit generates an object guiding the guidance section using information of the guidance start point and the guidance end point, and
- the control unit controls the display unit to display the generated object through the augmented reality during a period in which the vehicle is positioned in the guidance section.

17. A non-transitory computer readable storage medium containing instructions, that when executed by one or more processors, cause the one or more processors to perform a method, the method comprising:
- determining a position of a vehicle that is being operated;
- detecting information of a guidance point positioned in front of the determined position of the vehicle by a predetermined distance using a map data;
- generating an object indicating the guidance point using the information of the guidance point;
- calculating position difference information between the position of the vehicle and a position of the guidance point in augmented reality;
- determining a position of the guidance point on a virtual three-dimensional (3D) space using the calculated position difference information;
- mapping the generated object to the virtual 3D space based on the determined position of the guidance point;
- converting the virtual 3D space to which the object indicating the guidance point is mapped into a 2D image to generate a 2D augmented reality image; and
- controlling a display unit to display the generated 2D augmented reality image.

* * * * *